United States Patent
Uchino et al.

(10) Patent No.: US 6,865,715 B2
(45) Date of Patent: Mar. 8, 2005

(54) STATISTICAL METHOD FOR EXTRACTING, AND DISPLAYING KEYWORDS IN FORUM/MESSAGE BOARD DOCUMENTS

(75) Inventors: Kanji Uchino, Kawasaki (JP); Hiroshi Tsuda, Kawasaki (JP); Kunio Matsui, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/048,026

(22) Filed: Mar. 26, 1998

(65) Prior Publication Data

US 2001/0018698 A1 Aug. 30, 2001

(30) Foreign Application Priority Data

Sep. 8, 1997 (JP) .......................................... 09-242247

(51) Int. Cl.[7] ................................................ G06F 3/14
(52) U.S. Cl. ....................... 715/526; 715/500; 715/531; 707/7
(58) Field of Search ............................. 715/500, 501.1, 715/513, 526, 531; 707/7, 10, 501, 513

(56) References Cited

U.S. PATENT DOCUMENTS 5,586,239 A * 12/1996 Ueda .......................... 345/326
5,732,260 A * 3/1998 Nomiyama ................... 707/5

(List continued on next page.)

FOREIGN PATENT DOCUMENTS

| JP | 2-29782 | 1/1990 |
| JP | 3-95673 | 4/1991 |
| JP | 8-287087 | 11/1996 |

OTHER PUBLICATIONS

Cameron et al, "Learning GNU Emacs", 2nd Ed, O'Reilly, 9/96, sect. 6.4–6.4.8.*
Medves, G., "LawLink: The Newsletter of the Bora Laskin Law Library Searching Lexis", http://www.law–lib.utoronto.ca/lawlink/v2n7.htm, Apr. 1996.*
Medline description—http://www.chemie.fu–berlin.de/chemistry/chemdb/stn/medline.txt, 7/97.*
Lemay et al, Creating Commercial Web Pages, Sams.net, p. 162–165.*

Primary Examiner—Cesar B Paula
(74) Attorney, Agent, or Firm—Staas & Halsey LLP

(57) ABSTRACT

A group of documents in a forum/message board are stored as a document group database in a predetermined server computer. A document group analysis device analyzes a group of documents contained in each set of documents corresponding to each message board in the document group database. A summation device generates a meta-index, a thread index, and an indexed file. A display device displays a group of documents in a display format of a keyword view, a thread view, or an author view using a meta-index and a thread index.

8 Claims, 68 Drawing Sheets

U.S. PATENT DOCUMENTS

| | | | | |
|---|---|---|---|---|
| 5,768,580 A | * | 6/1998 | Wical | 395/613 |
| 5,787,416 A | * | 7/1998 | Tabb et al. | 707/2 |
| 5,815,830 A | * | 9/1998 | Anthony | 707/6 |
| 5,819,269 A | * | 10/1998 | Uomini | 707/7 |
| 5,822,539 A | * | 10/1998 | Van Hoff | 709/236 |
| 5,832,497 A | * | 11/1998 | Taylor | 707/104 |
| 5,835,084 A | * | 11/1998 | Bailey et al. | 345/783 |
| 5,835,922 A | * | 11/1998 | Shima et al. | 707/522 |
| 5,867,799 A | * | 2/1999 | Lang et al. | 707/1 |
| 5,905,863 A | * | 5/1999 | Knowles et al. | 709/206 |
| 5,913,215 A | * | 6/1999 | Rubinstein et al. | 707/10 |
| 5,923,846 A | * | 7/1999 | Gage et al. | 709/213 |
| 5,924,105 A | * | 7/1999 | Punch, III et al. | 707/513 |
| 5,933,599 A | * | 8/1999 | Nolan | 345/329 |
| 5,940,830 A | * | 8/1999 | Ochitani | 707/10 |
| 5,940,831 A | * | 8/1999 | Takano | 707/10 |
| 5,943,669 A | * | 8/1999 | Numata | 707/5 |
| 5,948,058 A | * | 9/1999 | Kudoh et al. | 705/30 |
| 5,956,708 A | * | 9/1999 | Dyko et al. | 707/3 |
| 5,970,505 A | * | 10/1999 | Ebrahim | 707/501 |
| 5,974,409 A | * | 10/1999 | Sanu et al. | 707/3 |
| 5,978,768 A | * | 11/1999 | McGovern et al. | 705/1 |
| 5,987,472 A | * | 11/1999 | Serafin | 707/104 |
| 6,021,409 A | * | 2/2000 | Burrows | 707/102 |
| 6,028,601 A | * | 2/2000 | Machiraju et al. | 345/336 |
| 6,029,164 A | * | 2/2000 | Birrell et al. | 707/3 |
| 6,034,970 A | * | 3/2000 | Levac et al. | 370/466 |
| 6,088,696 A | * | 7/2000 | Moon et al. | 707/10 |
| 6,119,152 A | * | 9/2000 | Carlin et al. | 709/217 |
| 6,161,130 A | * | 12/2000 | Horvitz et al. | 709/206 |
| 6,226,655 B1 | * | 5/2001 | Borman et al. | 715/501.1 |
| 6,430,607 B1 | * | 8/2002 | Kavner | 709/217 |
| 6,484,196 B1 | * | 11/2002 | Maurille | 709/206 |

* cited by examiner

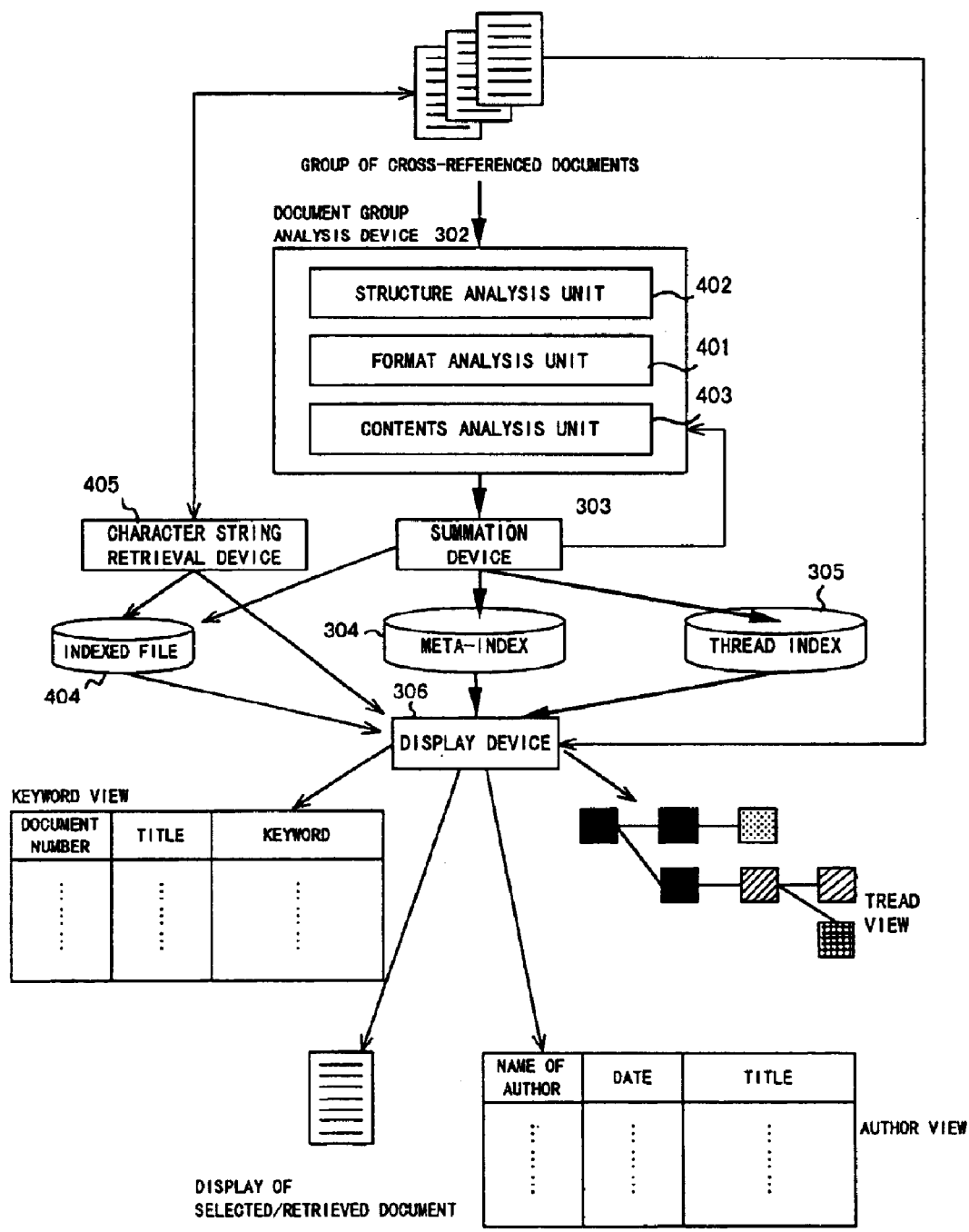
F I G. 4

| DOCUMENT NUMBER | REFERENCE DOCUMENT NUMBER | TITLE | NAME OF AUTHOR | KEYWORD | NUMBER OF LINES | COLOR NUMBER | DATE |
|---|---|---|---|---|---|---|---|
| ... | ... | ... | ... | ... | ... | ... | ... |
| 004 | 001 | TELL ME | UCHINO | — | 12 | 4 | 96/10/05 |
| 005 | 004 | Re: TELL ME | TSUDA | — | 45 | 4 | 96/10/08 |
| 006 | 005 | APPLICATION OF Java | UCHINO | — | 80 | 6 | 96/10/15 |
| *007 | — | DEFECTIVE HD? | MATSUI | SunOS, HD, 64MB, FORMAT | 12 | 1 | 96/10/18 |
| ......... | ......... | ......... | ......... | ......... | ......... | ......... | ......... |

\* INDICATES ROOT DOCUMENT NUMBER

FIG. 5

| ROOT DOCUMENT NUMBER | NUMBER OF DOCUMENTS | STRUCTURE OF THREAD |
|---|---|---|
| ⋯ | | |
| 001 | 6 | (001 (002 003) (004 (005 006))) |
| 007 | 5 | (007 008 009 (011 012)) |
| ⋯⋯ | | |

MEANING OF LISTING: (PARENT DOCUMENT NUMBER   CHILD DOCUMENT NUMBER/SUB-TREE   CHILD DOCUMENT NUMBER/SUB-TREE ⋯⋯)

| INDEXED WORD | KEYWORD CONTAINING INDEXED WORD | THREAD NUMBER* |
|---|---|---|
| INTERNET | ·STARTING INTERNET | 00496 |
|  | ·CONNECTION TO INTERNET | 00218 |
| CONTROL | ·CONTROL PANEL | 00518 |
| DOMAIN | ·DOMAIN NAME SERVER | 00128 |
|  | ·DOMAIN IN NATION | 00476 |
| ⋮ | ⋮ | ⋮ |

\* THREAD NUMBER MEANS ROOT DOCUMENT NUMBER OF THREAD.

FIG. 7

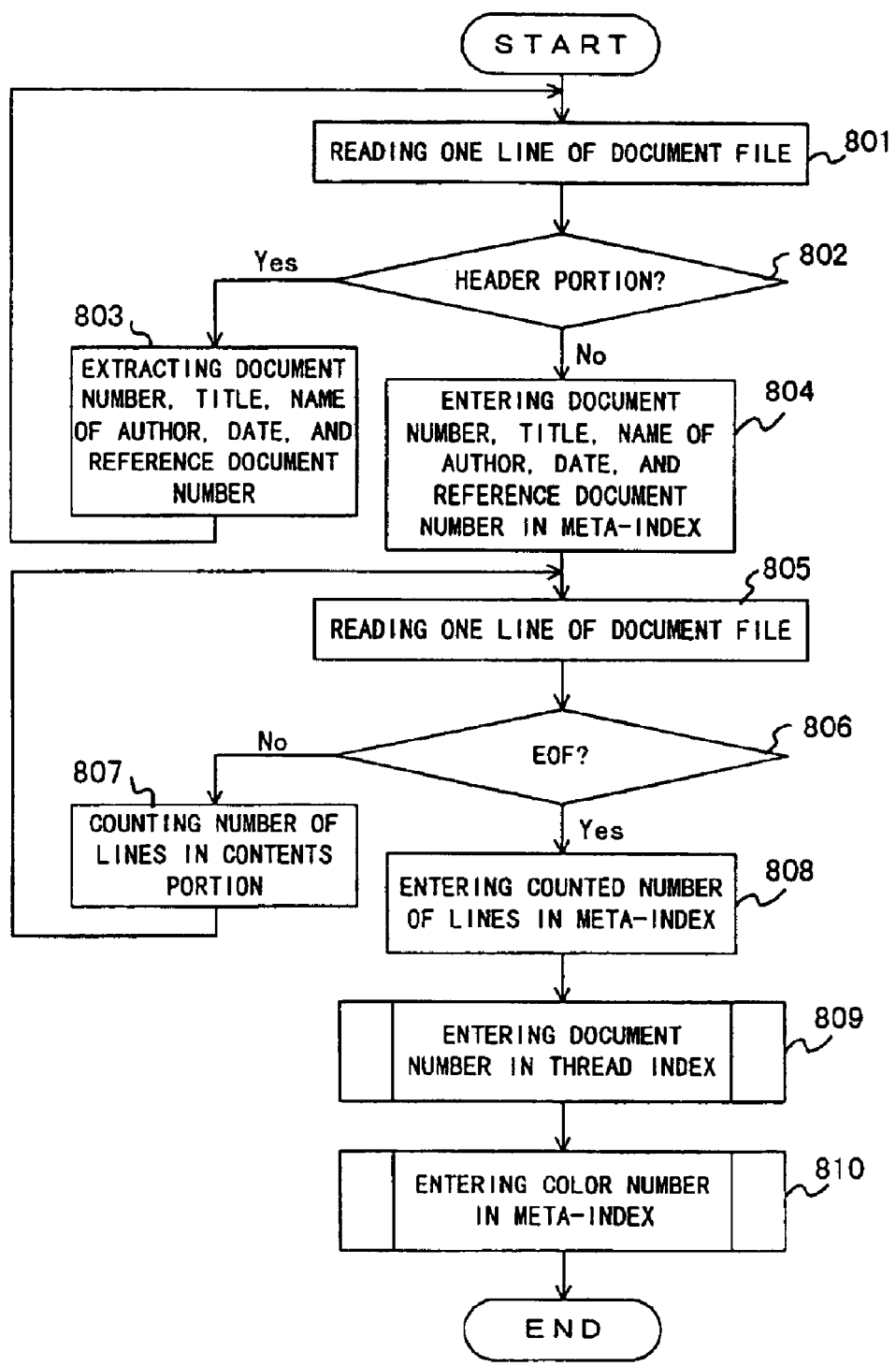
F I G. 8

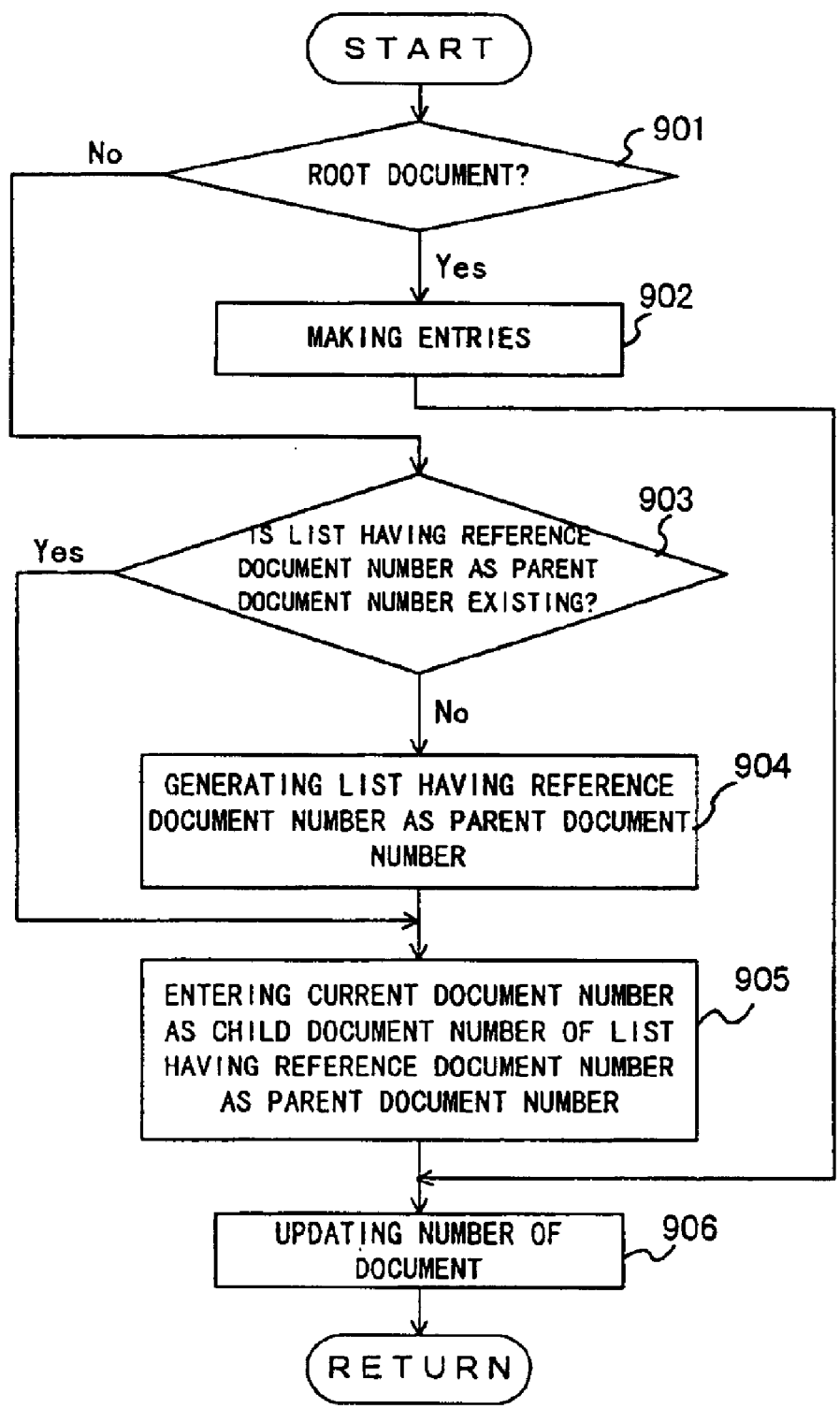
F I G. 9

| ROOT DOCUMENT NUMBER | COLOR NUMBER | TITLE | DOCUMENT NUMBER |
|---|---|---|---|
| ⋮ | ⋮ | ⋮ | ⋮ |
| 001 | #1 | (MAIN TOPIC) | 001, 002, 004 |
| | #2 | (SUB-TOPIC 1) | 003 |
| | #3 | (SUB-TOPIC 2) | 005, 006 |
| ⋮ | ⋮ | ⋮ | ⋮ |

FIG. 12

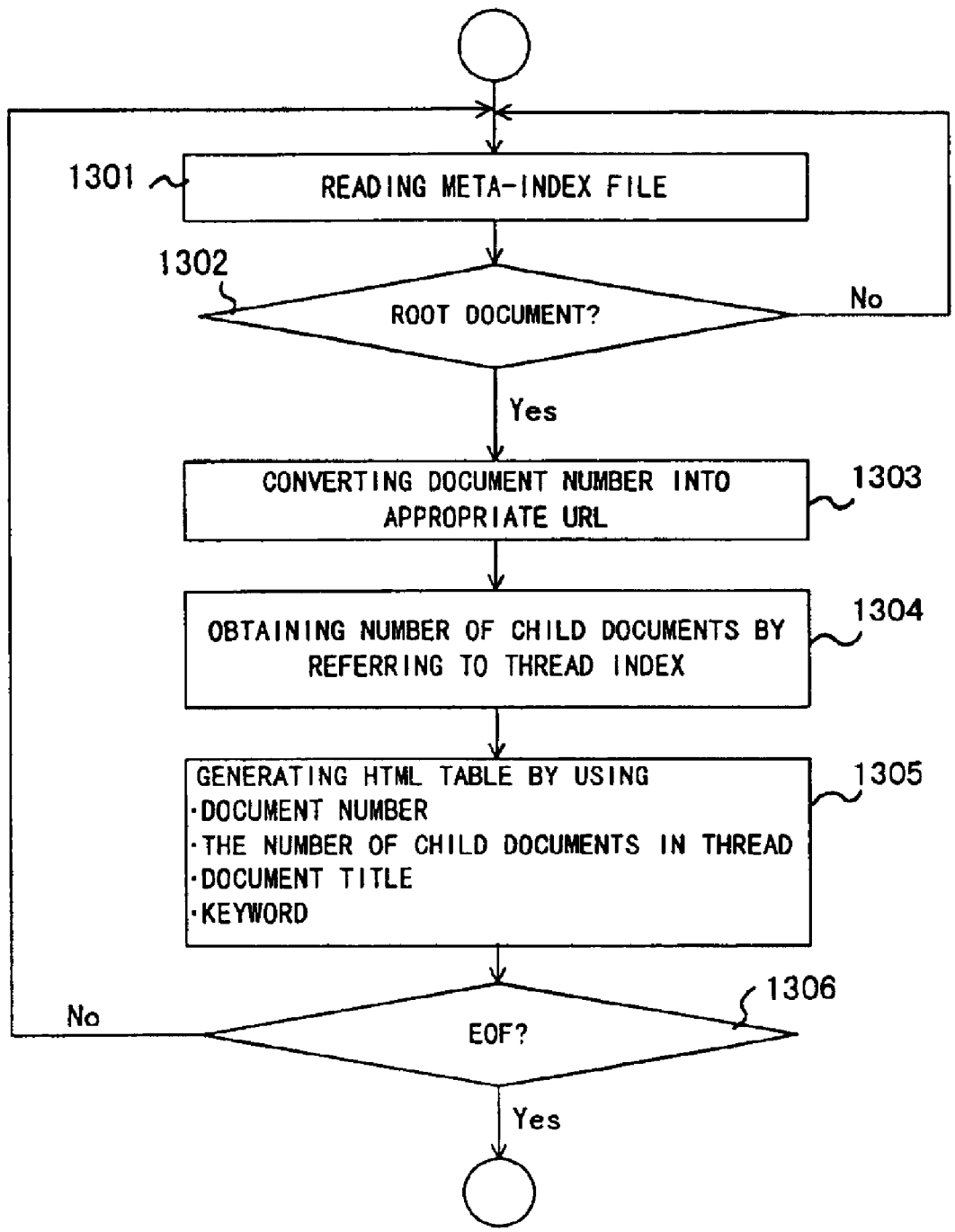
F I G. 1 3

LIST IN TREE STRUCTURE: (001(002 003) (004(005 006)))

|   | 1 | 2 | 3 | 4 |
|---|---|---|---|---|
| 1 | 001 | 002 | 003 | BLANK |
| 2 | BLANK | 004 | 005 | 006 |

ARRAY INDICATING TREE STRUCTURE

F I G.  1 5

EXAMPLE OF AUTHOR ARRAY

| AUTHOR A | 001, 005, 007, 008 |
|---|---|
| AUTHOR B | 011, 012, 013 |
| AUTHOR C | 003, 009, 010 |
| AUTHOR D | 004, 006 |
| AUTHOR E | 002 |

FIG. 17

EXAMPLE OF AUTHOR ARRAY

| AUTHOR A | 001, 005, 007, 008 | → YELLOW |
|---|---|---|
| AUTHOR B | 011, 012, 013 | → BLACK |
| AUTHOR C | 003, 009, 010 | → RED |
| AUTHOR D | 004, 006 | → BLUE |
| AUTHOR E | 002 | → GREEN |

F I G. 20A

EXAMPLE OF DATE ARRAY

| 97/04/15 | 001, 002, 003, 004 | → YELLOW |
|---|---|---|
| 97/04/21 | 005, 006 | → BLACK |
| 97/04/28 | 007, 008, 009 | → RED |
| 97/05/25 | 010 | → BLUE |
| 97/05/26 | 011, 012, 013, 014, 015 | → GREEN |

F I G. 20B

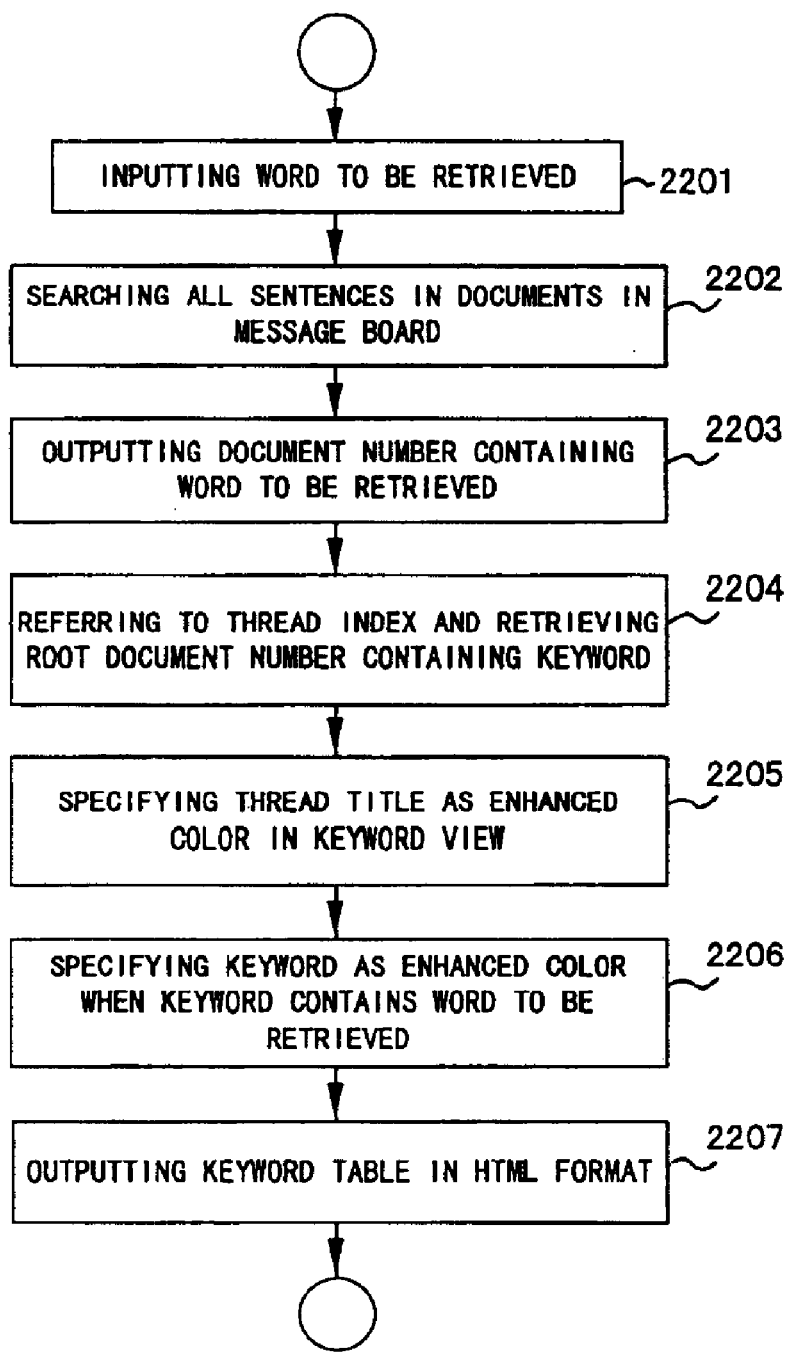
F I G. 2 2

| ROOT DOCUMENT NUMBER | COLOR NUMBER | TITLE | MESSAGE NUMBER | KEYWORD |
|---|---|---|---|---|
| ... | ... | ... | ... | ... |
| 001 | #1 | (MAIN TOPIC) | 001, 002, 004 | ..... |
| | #2 | (SUB-TOPIC 1) | 003 | ..... |
| | #3 | (SUB-TOPIC 2) | 005, 006 | ..... |
| ... | ... | ... | ... | ... |

FIG. 24

KEYWORD VIEW OF fgal_internet_QA

[THREAD VIEW]    [SENDER VIEW]

| ID | | | TITLE | KEYWORD |
|---|---|---|---|---|
| 00001 | ☐ | 1 | PREFACE | CONTENTS OF QUESTIONS / THIS MESSAGE BOARD / TITLE OF MESSAGE / Internet / RELEVANT QUESTIONS AND ANSWERS / CONNECTION TYPE / ENVIRONMENT FOR ... (HARDWARE / APPROPRIATE ADVICE FOR CONTENTS / BABA / INABA / Manager |
| 00002 | ☐ | 3 | MINIMAL HARDWARE | NET SURFING LATELY IN FASHION / INTERNET / DEFACT STANDARD NETSCAPE NAVIGATOR / PENTIUM MACHINE / THIS WAY / PC COMMUNICATION IF ... / PROVISIONS OF LAW / VARIOUS SERVICES / Worldtalk OF People / MADI |
| 00005 | ☐ | 3 | QUESTION: CANNOT BE CONNECTED TO HOMEPAGE | PROVIDER / CONFIRMATION OF PASSWORD / APPLICABLE MODEL / SETTINGS / DEFAULT OF NETSCAPE / DIAL UP IP CONNECTION / APPLICABLE SOFTWARE / FMV*DPSP5 / USER NAME |
| 00008 | ☐ | 6 | INTERNET START | PROVIDER / HOME PAGE / FEE / STARTING TIME OF TELEHODAI / WWW / ACCESS / ISDN / ANALOG 288 / BAUD RATE / nifty COMMAND |
| 00014 | ☐ | 1 | THANKS EVERYBODY | PROVIDER RECOMMENDED BY REYA / IMPOSSIBLE NETWORKER / CALL TOMORROW / DISCOUNT OF GOLD FOR EMPLOYEES / SUMMARIZED ... / CHALLENGING IN MANY FIELDS / ... IN NAGOYA / ROADS5 / OTHER DAY / SUBSIDIARY |
| 00015 | ☐ | 24 | NIFTY DIAL UP CONNECTION | @niftyserve / ISN'T IT? / SCRIPT / SubManager / or / PEOPLE FROM VENUS / NIFTYServe / INTERNET / WIZARD / kazusi |
| 00016 | ☐ | 1 | SELECTING PROVIDER | IMPOSSIBLE NETWORKER / ONLINE SI... / RECOMMENDED BY REYA / SETTING HOME PAGE / REQUEST FOR MATERIAL / ... UP / FIXED FEE / EXTENT RELIABLE / RATHER HARD / ALLESNET |
| 00030 | ☐ | 9 | PROVIDER ... BAUD RATE BETWEEN HOME PC | SERVER-SERVER HOME PC / @niftyserve / PROXI... / T*K / ping / MNP5 / CACHE FOR LOWER LAYER / SubManager / PEOPLE FROM VENUS / MODEM COMMAND |
| 00040 | ☐ | 24 | NIF CONNECTION MAIL | INTERNET MAIL/ @niftyserve / SubManager / or / BABA / INABA / PEOPLE FROM VENUS / NIF-CONNECTED MEMBER / NIFTYServe / IN SERVICE / kazusi |

FIG. 25

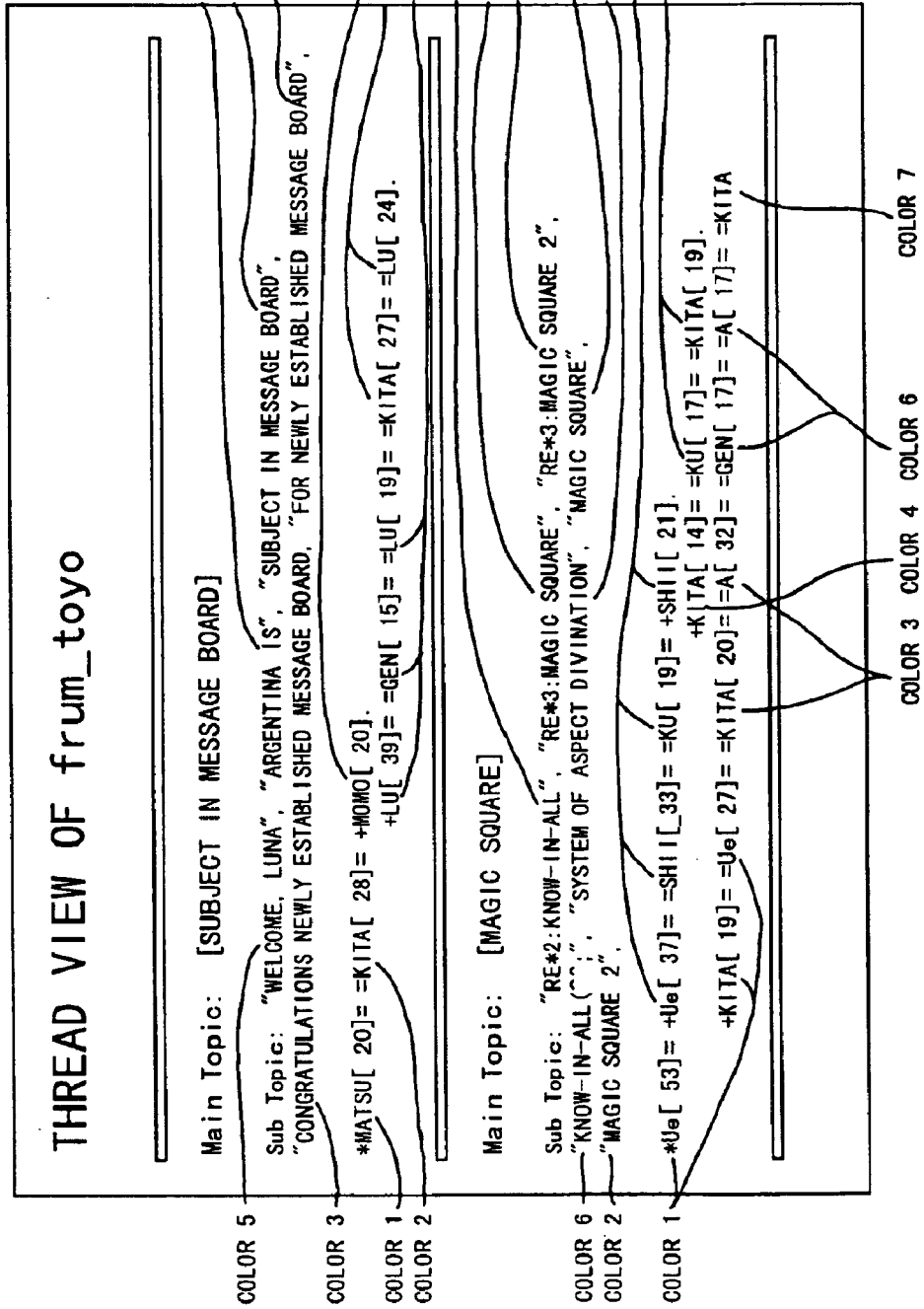

| | | | |
|---|---|---|---|
| MURA | | 8: | [RE^4: DOES ANYBODY KNOW SANYNET?] |
| | SEPTEMBER | 11: | [Admin AUTHORIZATION FOR RE>NT] |
| | | 30: | [QuickTime WITH NESUKE3.0i β 6] |
| | OCTOBER | 1: | [RE^2: QuickTime WITH NESUKE 3.0i β 6]  [RE>NN3Ja β CANNOT BE INSTALLED] |
| | | 2: | [RE>QuickTime WITH NESUKE 3.0i β 6]  [RE>QuickTime WITH NESUKE 3.0i β 6] |
| KANCHAN | JULY | 25: | [WANT TO RED news WITH 98+DOS] |
| | | 27: | [WANT TO RED news WITH RE: 98+DOS] |
| | SEPTEMBER | 29: | [ABOUT EXTENSION rar]  [RE: MAIL WITH NO SENDER NAME] |
| | | 30 | [RE: ABOUT EXTENSION rar] |
| | OCTOBER | 1 | [RE: ABOUT EXTENSION rar] |
| YOSHI CHAN | MAY | 6: | [RE^1: NIFTY DIAL UP CONNECTION] |
| | | 18: | [RE^5: NIFTY DIAL UP CONNECTION] |
| | AUGUST | 5: | [RE^2: DOES ANYBODY KNOW SANYNET?] |
| | | 6: | [RE^3: DOES ANYBODY KNOW SANYNET?] |
| OSAMU ARAKI | AUGUST | 3: | [PRIMARY QUESTION ABOUT ActiveX] |
| | | 8: | [RE: PRIMARY QUESTION ABOUT ActiveX] |
| | | 31: | [IE3 FORMAL VERSION TROUBLE] |
| | SEPTEMBER | 2: | [RE: IE3 FORMAL VERSION TROUBLE] |
| | | 3: | [RE: IE3 FORMAL VERSION TROUBLE] |
| TOSHIHIRO SAKAWA | SEPTEMBER | 9: | [CANNOT BE CONNECTED TO INTERNET (2)] |
| | | 14: | [CANNOT BE CONNECTED TO INTERNET (2)] |
| | | 15: | [RE:RE^2: CANNOT BE CONNECTED TO INTERNET (2)] |
| | | 16: | [RE:COMMON CONNECTION METHOD] |
| Mue | AUGUST | 4: | [RE: QUESTION HOW CAN HOME PAGE BE PRINTED ...] |
| | | 18: | [RE: PPP COMPARISON BETWEEN Hyper Road AND Road4] |
| | | 25: | [RE: ABOUT INET SETUP WIZARD] |
| SADAYUKI ANDO | JULY | 27: | [FELL IN TROUBLE SOS!] |
| | | 28: | [RE: FELL IN TROUBLE SOS!] |
| | | 30: | [RE: FELL IN TROUBLE SOS!] |
| N-DATE. | AUGUST | 18: | [ABOUT RealAudio PLUG IN] |
| | | 19: | [RE: ABOUT RealAudio PLUG IN] |
| | | 25: | [RE: ABOUT INSTALLING RealAudio] |

FIG. 27

```
PROVIDER - - - BAUD RATE BETWEEN HOME PC

00030/00524 AAA00001   AAA          PROVIDER - - - BAUD RATE BETWEEN HOME PC
(12)  96/05/10 03:02                NUMBER OF COMMENTS: 1

WHEN WE SEE Homepage, SERVER-SERVER-HOME PC CONNECTION IS TO BE MADE?
(ACTUALLY THERE MUST BE OTHER METHODS)

WHAT'S THE BAUD RATE BETWEEN SERVERS?  IS IT 14400bps(IN MY CASE) SET
USING MODEM COMMAND?

SINCE DATA ARE OVERFLOWING IN MANY CASES ...

AAA (AAA00001)
────────────────────────────────────────────────────────────────────────────
THREAD

*00030=  =00031=  =00034=  =00035=  +00038=  =00054.
                                    +00066=  =00067=  =00068.

<<Prev - - -thread - - -Next>>
 [KEYWORD VIEW]   [THREAD VIEW]   [SENDER VIEW]

┌──────────────────────┐
 │RETRIEVAL FROM ENTIRE │
 │MESSAGE BOARD         │
 └──────────────────────┘
```

FIG. 28

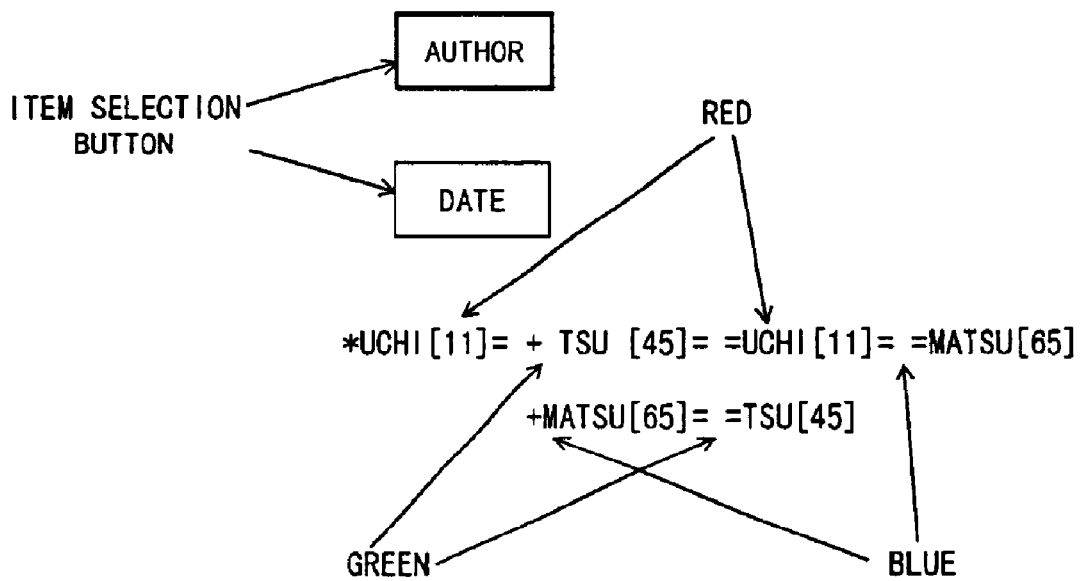
F I G. 2 9

DOCUMENT RETRIEVAL PAGE IN fgal_internet_QA MESSAGE BOARD

THIS SERVER SEARCHES DOCUMENT RESOURCES OF fgal_internet_QA MESSAGE BOARD.
ENTER RETRIEVAL CHARACTER STRING AND RETRIEVAL CONDITION IN THE FOLLOWING FORMAT,
AND CLICK THE SEARCH BUTTON.
SINCE DATA CAN BE SELECTED FROM A RETRIEVAL RESULT, IT IS RECOMMENDABLE NOT TO
START RETRIEVAL UNDER SERVER CONDITIONS.
DOCUMENT CONTAINING ANY OF ......

| UNIX |

| |

| |

EXCLUDING

| NETSCAPE |

| INTERNET |

| HOMEPAGE |

...... IS TO BE RETRIEVED.
THE UPPER OR LOWER CASE OF ALPHABETICAL CHARACTERS SHOULD/SHOULD NOT BE
DISTINGUISHED, AND BLANK CHARACTER STRING IS RETRIEVED AS IGNORED /
WITHOUT IGNORED.

[ Search ]

RETURN TO FIRST PAGE                    ABOUT....

FIG. 30

WORD TO BE RETRIEVED: PROTOCOL
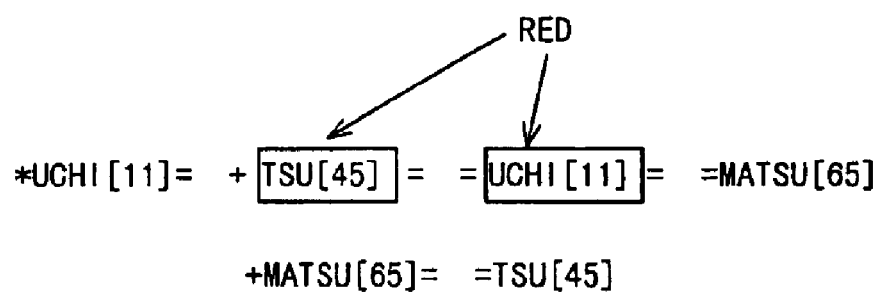
F I G. 3 1

Result: FOUND

IN THE DOCUMENT RESOURCES OF THE fgal_internet_QA MESSAGE BOARD, THERE ARE 14/518 ITEMS SATISFYING LOGIC EXPRESSION (UNIX) 8 NETSCAPE & INTERNET & HOMEPAGE.

1.  00064 : RE^2: PROTOCOL
2.  00091 : RE: chmod IS
3.  00204 : RE: TELL ME HOW TO DOWNLOAD NIF.
4.  00212 : RE^2: TELL ME HOW TO DOWNLOAD NIF.
5.  00233 : RE: RE: I HAVE GIVEN YOU INFORMATION ...
6.  00270 : RE^2:
7.  00308 : TIY
8.  00330 : RE: RE^2: TELL ME HOW TO DOWNLOAD NIF.
9.  00343 : BPULS FOR UNIX
10. 00349 : RE: PREVENTING PROCESS FROM BEING LEFT OVER
11. 00376 : RE: MONITOR CANNOT BE SEEN?
12. 00463 : RE: Q HOW CAN EXTENSION WITH taz ....
13. 00475 : RE^2: HOW CAN EXTENSION WITH taz ....
14. 00480 : RE^4: Q HOW CAN EXTENSION WITH taz ....

---

SELECTIVE RETRIEVAL

SELECTIVE RETRIEVAL CAN BE MADE BY SETTING CONDITIONS FROM THE RETRIEVAL RESULTS. CLICK THE SEARCH BUTTON WITH THE FOLLOWING CONDITIONS SPECIFIED. WHEN NEW RETRIEVAL IS STARTED, RETURN TO THE FIRST PAGE.

FIG. 33

MAIN TOPIC: WHAT IS THE FIRST QUESTION?

| SUB-TOPIC | KEYWORD |
|---|---|
| A OUR TEACHER ··· CABLE | B UNIVERSITY  C SCHOOL BUILDING  START OF INTERNET |
| PROTOCOL | telnet  ftp  PROTOCOL OF UNIX MACHINE ······ |
| ⋮ | ⋮   ⋮ |

F I G. 34

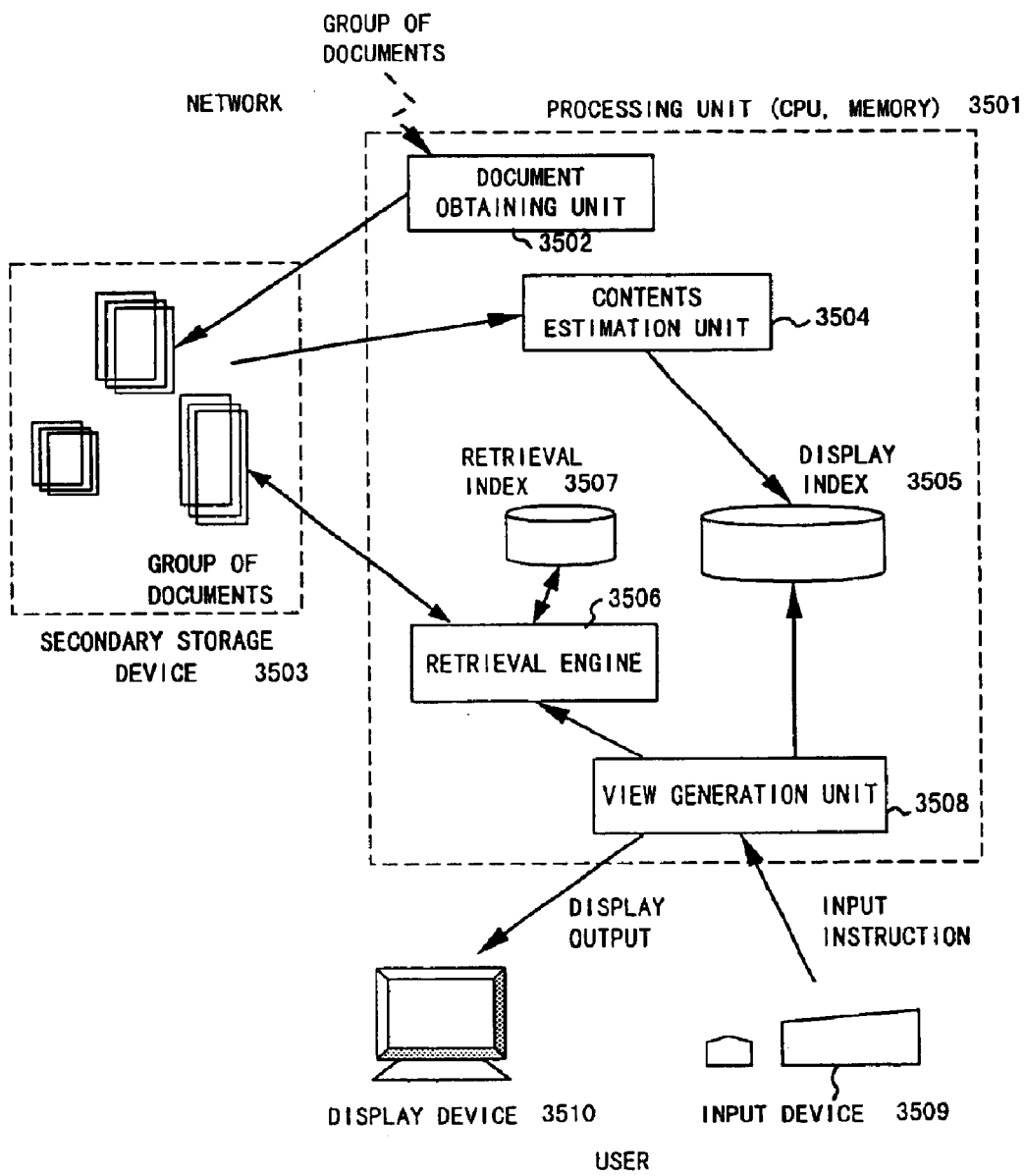
F I G. 3 5

| User ID | NAME | ABBREVIA-TION | NUMBER OF MESSAGES (NUMBER OF ANSWERS) |
|---|---|---|---|
| ⋮ | ⋮ | ⋮ | |
| KX001 | TSUDA | TSU | 51 (26) |
| KX002 | UCHINO | UCHI | 42 (24) |
| ⋮ | ⋮ | ⋮ | |

F I G. 3 6

| DOCUMENT ID | User ID | TITLE | DATE | NUMBER OF RELATED REFERENCES | PATH TO ROOT | IDENTIFICATION NUMBER OF TITLE | TYPE OF MESSAGE |
|---|---|---|---|---|---|---|---|
| 001 | AAA | SETTING OF PRINTER UNCERTAIN! | 97/9/5 | 2 | 001 | 1 | Q |
| 002 | BBB | RE: SETTING OF PRINTER UNCERTAIN! | 97/9/6 | 1 | 002, 001 | 1 | A |
| 003 | AAA | THANKS A LOT. | 97/9/6 | 0 | 003, 002, 001 | 2 | T |
| ...... | ...... | ...... | ...... | ...... | ...... | ...... | |

FIG. 37

| THREAD ID | TREE STRUCTURE OF THREAD | NUMBER OF DOCUMENTS | NUMBER OF AUTHORS | UID OF LARGEST NUMBER OF MESSAGES | CONTENTS LIST |
|---|---|---|---|---|---|
| ...... | ...... | ...... | ...... | ...... | |
| 001 | (001 (002 003) (004 (005 006))) | 6 | 4 | KX001 | (Q001, D002, C003) |
| 007 | (007 008 009 (011 012)) | 5 | 4 | KX002 | (Q003, Q004) |
| ...... | ...... | ...... | ...... | ...... | |

F I G. 3 8

| QA_ID | Question | Answer | Thanks | Max AnswerUID |
|-------|----------|--------|--------|---------------|
| ⋮ | ⋮ | ⋮ | ⋮ | ⋮ |
| Q0011 | 001 | 002 | 003 | KX001 |
| ⋮ | ⋮ | ⋮ | ⋮ | ⋮ |

* QA-ID IS FORMED BY CHARACTER STRING QA, THREAD ID, AND SERIAL NUMBER.

* ALL DOCUMENTS IN PATH FROM Question DOCUMENT TO Thanks DOCUMENTS ARE ENTERED AS Answer DOCUMENT.

* LARGEST NUMBER OF UIDS IN GROUP OF ANSWER DOCUMENTS ARE ENTERED AS MaxAnswerUID

FIG. 39

| DS_ID | MESSAGE ID LIST | UID | Thread ID |
|---|---|---|---|
| ...... | ...... | | |
| D0011 | (001 002 003 004 005 006 007 008) | AAAA BBBB | 001 |
| ...... | ...... | | |

* VALUE OF DS_ID IS FORMED BY CHARACTER STRING DS, THREAD ID, AND SERIAL NUMBER.

F I G. 4 0

| CT_ID | Chat LIST | Thread ID |
|---|---|---|
| ...... | ...... | ...... |
| C0011 | (001 002 003 004 005 006 007 008 009) | 001 |
| ...... | ...... | ...... |

\* VALUE OF CT_ID IS FORMED BY CHARACTER STRING DS, THREAD ID, AND SERIAL NUMBER.

F I G. 4 1

- IS IT ....?
- DOES IT ....?
- TELL ME ....
- PLEASE ....
- MAY I ....?
- I WOULD LIKE TO ....
- QUESTION

- THANK YOU VERY MUCH.
- THANKS A LOT.
- I APPRECIATE ...
- I SEE ...

```
Coment Link Title: [CAN LIGHT CAR PULL TRAILER?]

*HA[20]=+IWA[35]==HA[22]==*[35].
       +*[67]==*[37].
       +*[16]==*[26].
```

F I G. 4 6

```
00001/00530  AAA00001  Q-person     making use of e-mail
(  8)    96/09/22 12:29                comments:1

I want to use e-mail. But I'm biginner, so I don't know how to use.
What can I do for the beginning.
Any coments, please!!
```

```
00002/00530  BBB00002  A-person     Re:making use of e-mail
(  8)    96/10/02 09:34 comment_to_00002   commets:1

Hi, Q-person, how do you do. Well, will you check "e-mail message board"
in beginners forum at first. It contains a lot of useful information.
```

```
00007/00530  AAA00001  Q-person     Re:making use of e-mail
(  8)    96/10/02 10:19 comment_to_00002

Hello,A-person.
I've cheked "e-mail message board" in beginners forum.
I could send e-mail to my friend.
Thank you very much.
```

FIG. 47

```
------------------------
Coment Link Title: [YEN SOARED?]

Coment Link Title: [HAD AN ACCIDENT(/_;), AND HEADACHE(LONG SENTENCE).]

*O[99]=+EI[35]=+TO[27]==KA[21]==TO[25]==A[27]==NE[45]==O[29].
　　　　　　　　　　+O[ 60].

F I G. 5 1

```
03128: [45: KAZUYOSHI OGAWA] AWAITED AZ-1
03129: [ 9: KAZUYOSHI OGAWA]
   03136: [29: Gaia]
      03153: [10: PARTZIWAL]
         03167: [29: Gaia]
            03181: [17: PARTZIWAL]
         03182: [24: KAZUYOSHI OGAWA]
      03154: [10: PARTZIWAL]
         03184: [10: KAZUYOSHI OGAWA]
            03189: [21: EF-3CIVIC]
               03201: [23: PARTZIWAL]
                  03209: [22: EF-3CIVIC]
                  03210: [17: KAZUYOSHI OGAWA]
               03200: [19: PARTZIWAL]
03137: [44: VERY MUCH]
   03155: [20: PARTZIWAL]
   03183: [27: KAZUYOSHI OGAWA]
```

```
+ 03128: [45: KAZUYOSHI OGAWA]   AWAITED AZ-1 (17)
+ 03129: [ 9: KAZUYOSHI OGAWA] Re: AWAITED AZ-1 (13)
+ 03136: [29: Gaia]   OH, LONG-AWAITED AZ-1 CHARACTERS (5)
  03154: [10: PARTZ|WAL] Re: AWAITED AZ-1
  03184: [10: KAZUYOSHI OGAWA] ALUMI OF 5 AND 5J
+ 03189: [21: EF-3C|VIC] Re: ALUMI OF 5 AND 5J (4)
```

F I G. 5 4

```
+ 03128: [45: KAZUYOSHI OGAWA]  AWAITED AZ-1
+ 03136: [29: Gaia]  OH, LONG-AWAITED AZ-1 CHARACTERS
+ 03184: [10: KAZUYOSHI OGAWA] ALUMI OF 5 AND 5J
  03210: [17: KAZUYOSHI OGAWA] TROUBLESOME?
  03183: [27: KAZUYOSHI OGAWA] SPRING AND INTERCOOLER
```

MESSAGES SATISFYING FOLLOWING CONDITIONS ARE
RETRIEVED FROM MESSAGE BOARD RELATING TO CARS IN XX
NEWS SERVICE.

⋯IS CONTAINED.
⋯IS NOT CONTAINED.

TYPE OF TARGET MESSAGE
    ⊙          ○
  ALL MESSAGES  Q & A

DATE OF TARGET MESSAGE
    ⊙          ○          ○
  ALL         WITHIN ONE MONTH  WITHIN ONE WEEK

SEARCH

LATEST UPDATE 97.10.10 3:10AM
ALL OF 12363 MESSAGES

FIG. 58

LISTED BELOW ARE RESULTS OF RETRIEVAL OF 'ENGINE'
FROM MESSAGE BOARD ABOUT CARS.
TOTAL OF 314 MESSAGES HAVE BEEN RETRIEVED.

TOP TEN THREADS ARE DISPLAYED BELOW.

| TITLE | AUTHOR | DATE | SIZE | CONTENTS |
|-------|--------|------|------|----------|
| xxxxx | yyy | 10/3 | 22 (14KB) | QA, DC |
| ...... | | | | |

→ NEXT TEN THREADS

FURTHERMORE, THOSE CONTAINING
··· AND NOT CONTAINING··· ARE
SELECTED

REFINE

FIG. 60

DISPLAYED BELOW IS STRUCTURE OF THREAD…

('ENGINE' IS BEING RETRIEVED)

+ xxxxx(yyyy)  [Q]....21
   Re: xxxxx(uuuuu)  [A]
  + Re: xxxxx(yyyy)              ...15
    Re: xxxxx(uuuuu)
     + ZZZZZ(VVVV)           ...7

LIST OF TITLES

FURTHERMORE, THOSE
CONTAINING … AND
NOT CONTAINING …
ARE SELECTED.

REFINE

FIG. 61

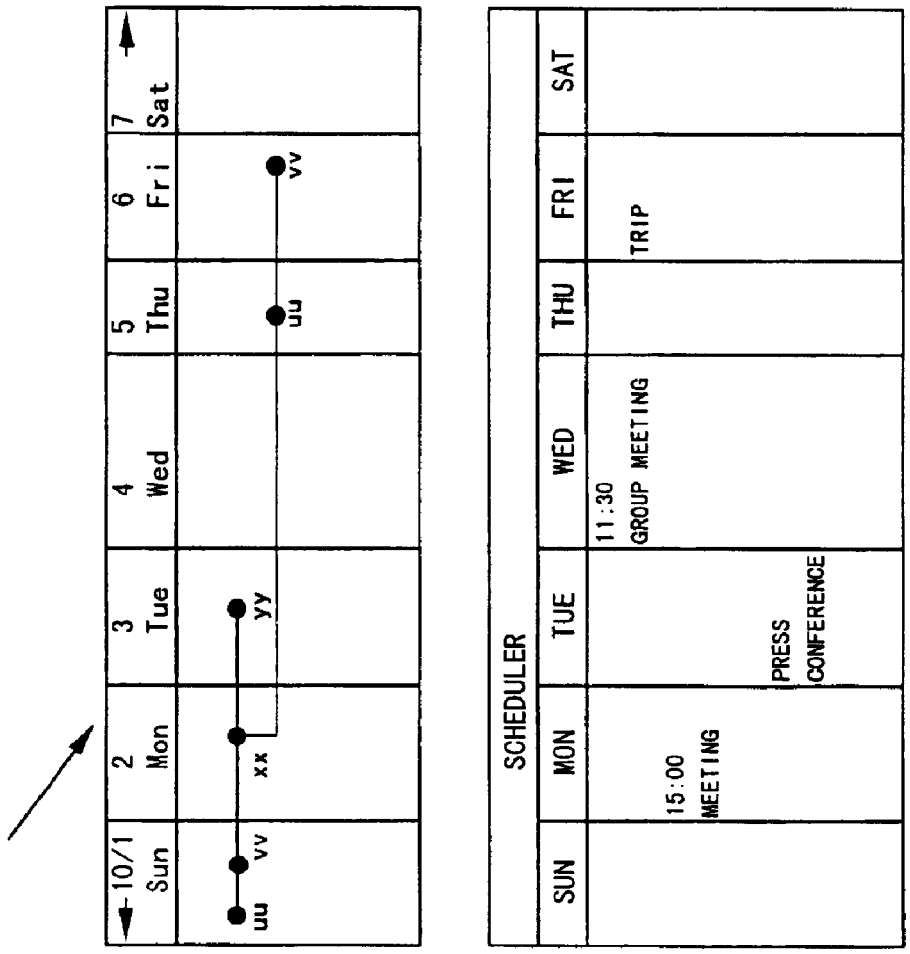
F I G. 6 2

| DATE | MESSAGE ID |
|---|---|
| 10/1 | 001, 002 |
| 10/2 | 003 |
| 10/3 | 004, 005, 006 |

FIG. 64

| PARENT MESSAGE / CHILD MESSAGE | AAA | BBB | CCC |
|---|---|---|---|
| AAA | 0 | 5 | 2 |
| BBB | 2 | 1 | 1 |
| CCC | 0 | 1 | 0 |

FIG. 66

STATISTICAL METHOD FOR EXTRACTING, AND DISPLAYING KEYWORDS IN FORUM/MESSAGE BOARD DOCUMENTS

BACKGROUND OF THE INVENTION

1. Field of the Invention

The present invention relates to a technology of supporting the access by users to necessary information by properly arranging a group of cross-referenced documents and displaying the group of documents from various points of views.

2. Description of the Related Art

In electronic conferences, electronic news, etc. established through personal computer communications or computer networks, there has been a request to easily and quickly locate a necessary document in a set of sequentially accumulated documents.

In response to the request, a conventional technology has been developed to present the users with a list of titles obtained by rearranging the titles of documents in a set of documents in the order of document generation date.

Another conventional technology displays cross-references of documents by classifying a set of documents into groups of cross-referenced documents and displaying an indented title of each document in a group of cross-referenced documents. A further conventional technology displays cross-references of documents by displaying the numbers of the documents in a set of documents in a tree format.

A further conventional technology searches entire documents in a set of documents for a specific key word, and lists search results.

However, since the information displayed by the above described conventional technologies is limited, the following problems cannot be solved by the above described conventional technologies.

1. To retrieve a required document or a group of documents probably containing a required document from a set of various documents, the only information to be referred to is a list of titles of documents. Since all titles do not correctly describe the contents of the documents, it is hard to obtain a desired retrieval result.
2. Indented titles and document numbers in a tree structure are not enough to correctly inform a user of the entire structure of a group of documents and of the transition of the subjects in the group of documents.
3. Necessary documents cannot be accessed from various points of view.
4. When there are a number of retrieval results, required documents cannot be accessed unless limited retrieval is performed or each of the retrieval result lists is checked.

On the other hand, a technology of extracting a keyword from a plurality of specific documents and automatically setting a link from each document containing a common keyword to another document is well-known. This conventional technology enables a plurality of relevant documents to be efficiently read by setting the documents as cross-referenced in specific documents such as published patents, technological theses, etc.

However, the above described conventional technology aims at easily referencing relevant documents, and cannot be used to support the retrieval of a necessary document or a group of documents which probably contains a necessary document.

SUMMARY OF THE INVENTION

The present invention has been developed based on the above described background to support the retrieval of a necessary document or a group of documents which probably contains a necessary document from a set of documents containing a large volume of documents.

The present invention is based on a relevant document display device for displaying a group of documents containing documents which can be cross-referenced.

The first aspect of the present invention is designed to have the following configuration.

First, a document group analysis device (structure analysis unit 402) classifies a plurality of documents forming a set of documents into one or more groups of documents (thread) which can be cross-referenced by analyzing the reference among the plurality of documents forming the set of documents, and extracts information relating to the classification as document group information (thread index 305).

A document group keyword extraction device (contents analysis unit 403) extracts a keyword contained in a document forming part of each group of documents by referring to document group information.

A document group keyword display device (display device 306) displays each document with a relevant title of the document associated with a keyword extracted by the document group keyword extraction device for each group of documents.

With the above described configuration according to the first aspect of the present invention, a group of documents probably containing a necessary document can be easily retrieved from a set of various documents using a keyword.

According to the second aspect of the present invention, the document group keyword display device having the configuration according to the first aspect of the present invention is designed to display with enhancement a group of documents containing a document specified by a user for retrieval, or a keyword specified for retrieval.

With the configuration according to the second aspect of the present invention, a group of documents specified for retrieval can be recognized at a glance.

The third aspect of the present invention has the following configuration.

The document group analysis device (structure analysis unit 402) classifies a plurality of documents forming a set of documents into one or more group of documents which can be cross-referenced by analyzing the reference among the plurality of documents forming the set of documents, and then extracts information about the classification as document group information.

A document attribute analysis device (format analysis unit 401) extracts document attribute information (meta-index 304) indicating the attribute of a document from each of a plurality of documents forming a set of documents.

A document group structure display device (display device 306) displays the reference among each group of documents by referring document group information and document attribute information in a tree structure in which each document attribute information or abbreviated information for each document forming part of the group of documents is displayed as each node. To be more practical, the document group structure display device displays the reference of each group of documents among a plurality of document groups in a tree structure in which an abbreviated name of an author of each document forming part of the group of documents is combined with document volume information (number of lines) to be displayed as each node.

With the configuration according to the above described third aspect of the present invention, the structure of the entire group of documents can be easily recognized.

According to the fourth embodiment of the present invention, the document group structure display device according to the above described third aspect of the present invention further displays a plurality of topics (a main topic and a sub-topic) extracted from a document contained in each group of document group by associating them with each node forming part of a tree structure displayed corresponding to the group of document. To be more practical, the document group structure display device displays for each group of document each topic and each relevant node in the same color.

With the above described configuration according to the fourth aspect of the present invention, the transition of the subject of the entire group of documents can be easily recognized.

According to the fifth embodiment of the present invention, the document group structure display device according to the above described third aspect of the present invention is designed to display with enhancement a node corresponding to the document specified for retrieval by a user.

With the above described configuration according to the fifth aspect of the present invention, the retrieval can be performed with the structure of the thread recognized.

The sixth aspect of the present invention has the following configuration.

The document group analysis device (structure analysis unit 402) classifies a plurality of documents forming a set of documents into one or more groups of documents which can be cross-referenced by analyzing the reference among the plurality of documents forming the set of documents, and extracts the information about the classification as document group information.

A topic analysis device (structure analysis unit 402) further classifies each of the classified document groups based on the topic extracted from a document forming part of each group of documents, and extracts the information relating to the further extraction as topic classification information (sub-topic index).

A topic keyword extraction device (contents analysis unit 403) extracts a keyword contained in a document related to a topic for each group of documents and each of the further classified topics of each of the group of documents.

A topic keyword display device (display device 306) displays the title, of a document relating to each group of documents and each of the further detailed topics, associated with the keyword extracted for each topic by the topic keyword extraction device. With the above described configuration according to the sixth aspect of the present invention, a precise limitation of topics can be performed using a keyword.

The present invention can be realized as a computer readable storage medium to direct a computer to perform the functions similar to those performed with each of the above described configurations according to the present invention.

As described above, a group of documents can be accessed from various points of views according to the present invention.

BRIEF DESCRIPTION OF THE DRAWINGS

Other objects and features of the present invention are easily understood by one of ordinary skill in the art by referring to the attached drawings and the descriptions of the preferred embodiments of the present invention.

FIG. 4 shows the configuration (2) of the system according to a preferred embodiment of the present invention;

FIG. 5 shows the structure of meta-indexed data;

FIG. 7 shows the data structure of an indexed file;

FIG. 8 is a flowchart showing the operations of the format analysis unit and the structure analysis unit;

FIG. 9 is a flowchart showing the operations when an entry of a document number is made in the thread index of a document number;

FIG. 12 shows an example of a color table; and

FIG. 13 is a flowchart showing the operation of a keyword view;

FIG. 15 is an example of a control array for a thread view;

FIG. 17 shows an example of a control array for an author view;

FIGS. 20A and 20B show examples of display arrays for authors and dates in respective colors;

FIG. 22 is a flowchart showing the operations of an enhanced display of a retrieval result using keyword views;

FIG. 24 shows an example of a sub-topic index;

FIG. 25 shows an example of displaying a keyword view;

FIG. 26 shows an example of displaying a thread view;

FIG. 27 shows an example of displaying an author view;

FIG. 28 shows an example of displaying the contents of a message;

FIG. 29 shows an example of displaying with enhancement (in different colors) a document attribute 'author' using a thread view;

FIG. 30 shows an example of displaying retrieval (input) of all messages in a message board;

FIG. 31 shows an example of displaying with enhancement a node containing a character string 'protocol' using a thread view;

FIG. 33 shows an example of displaying retrieval (output of result) of all messages in a message board;

FIG. 34 shows an example of displaying a keyword extracted from a sub-topic;

FIG. 35 shows the configuration according to the second embodiment of the present invention;

FIG. 36 shows the configuration of the user index;

FIG. 37 shows the configuration of the document index;

FIG. 38 shows the configuration of the thread index;

FIG. 39 shows the configuration of the QA index;

FIG. 40 shows the configuration of the DISCUSS index;

FIG. 41 shows the configuration of the CHAT index;

FIG. 44 shows an example of a pattern contained in a Q (question) document;

FIG. 45 shows an example of a pattern contained in a thanks document;

FIG. 46 shows an example of a thread structure estimated by the Q and A pattern determining process;

FIG. 47 shows an example of a thread document group estimated by the Q and A pattern determining process;

FIG. 49 shows an example of the thread structure estimated by the Discussion pattern determining process;

FIG. 51 shows an example of the thread structure estimated by the Chat pattern determining process;

FIG. 52 shows a display example of an original thread structure;

FIG. 53 shows a display example of an original thread structure;

FIG. 54 shows a display example of an original thread structure curtailed based on the number of reference nodes;

FIG. 55 shows a display example of a thread structure obtained by curtailing documents having the same title;

FIG. 56 shows a display example of a thread structure retrieved in time period units;

FIG. 58 shows a display example of the network news retrieval system;

FIG. 60 shows the output result 1: a list of threads;

FIG. 61 shows the output result 2: display of thread structure

FIG. 62 shows the output result 3: display of time period thread;

FIG. 64 shows the configuration of the data of a calendar index;

FIG. 66 shows the configuration of the data of author array;

DESCRIPTION OF THE PREFERRED EMBODIMENTS

The preferred embodiment of the present invention are described in detail below by referring to the attached drawings.

General Configuration

Figure 1:
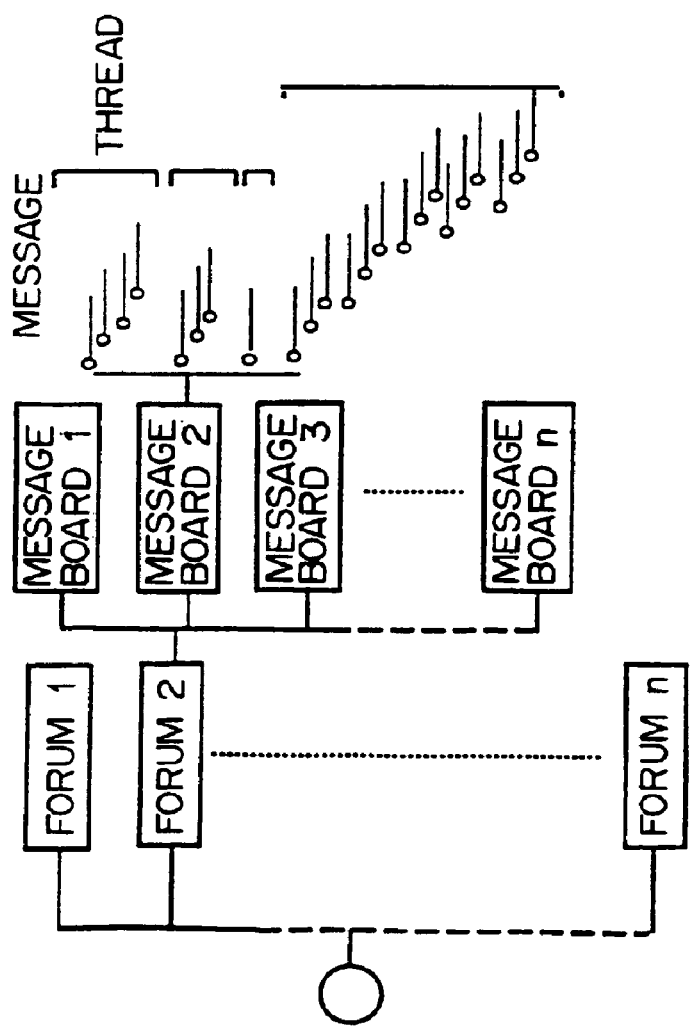
FIG. 1 shows an example of group of documents which can be cross-referenced.

FIG. 1 shows an example of a set of documents and a group of documents to be processed in the preferred embodiments of the present invention.

In this example, there are virtual public conference halls, through a computer network, referred to as forums in which users discuss for respective subjects. Each forum is divided into a plurality of virtual places referred to as message boards in which further detailed subjects are discussed about. Discussions proceed with documents of messages uploaded. Forums and message boards are defined as storage areas in a server computer, and store documents according to the above described division into virtual places. In each message board, a group of documents having a plurality of documents which can be cross-referenced forms a thread.

Figure 2:
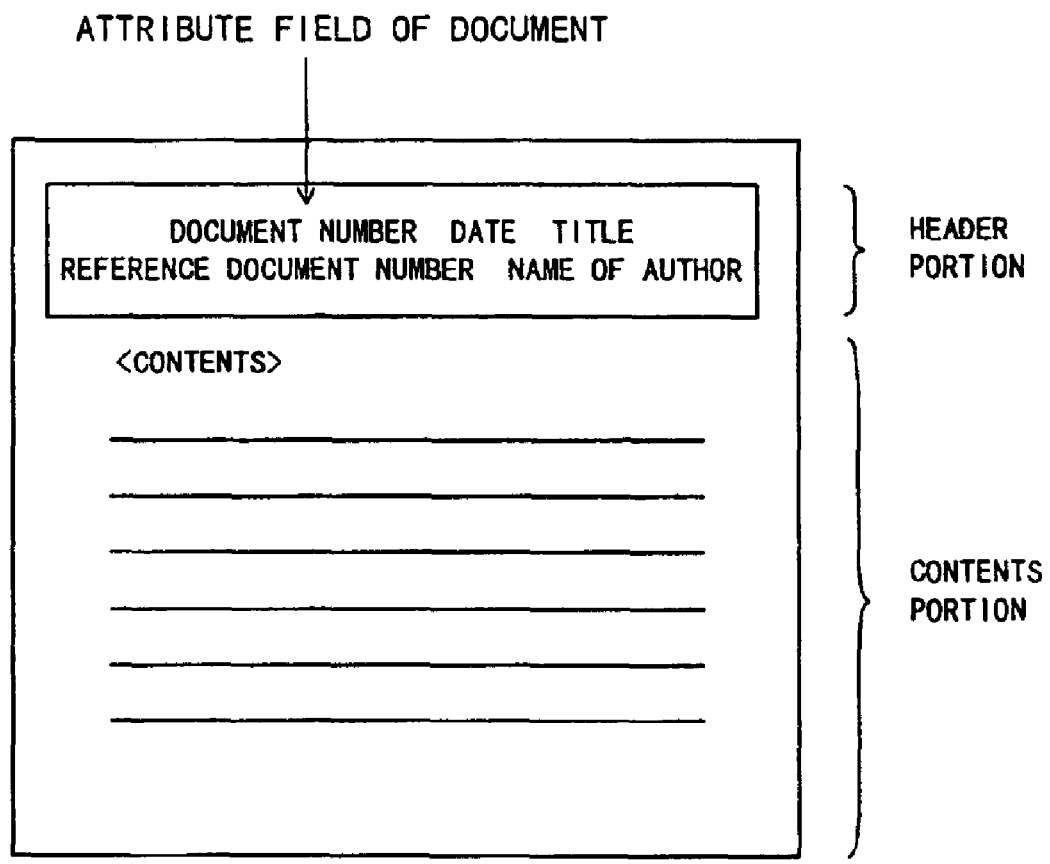
FIG. 2 shows an example of the data structure of a document.

A document provided by a user has, for example, a data structure shown in FIG. 2, and includes a header portion containing document attribute fields such as a document number indicating the number of the document, a date, a title, and a referenced document number to which the document refers, name of an author, etc. and a contents portion describing the body of the document.

The following display formats are provided according to the preferred embodiment of the present invention.

1. Keyword view: In a set of documents forming a message board, a keyword is extracted for each thread from a group of documents forming the thread. The extracted keywords are displayed in the format shown in FIG. 25 together with the number of the documents and the titles of the threads containing the documents.

Through the keyword view, a user can easily find a thread (group of documents) probably containing a necessary document in a set of various documents based on a keyword.

2. Thread view: A group of documents forming each thread are displayed in the display format shown in FIG. 26 in such a way that the references, titles, authors, and number of lines of document can be simultaneously recognized.

Through the thread view, the structure of the entire thread can be recognized, and the transition of a subject can be easily understood.

3. Author view: The titles of documents are classified based on authors, and sorted in order from largest to smallest number of messages. For the same author, the titles are sorted and displayed in the order of date as shown in FIG. 27.

From the viewpoint of an author and a date of a message, a document in a set of documents (message board) can be referred to.

4. Reflection of Retrieval Result on each view: A document relating to a user-specified retrieval keyword is displayed with enhancement in a keyword view, a thread view, etc. in the display format shown in FIG. 32 or 33.

As a result, documents can be more correctly recognized.

5. Switch of each view: A necessary document can be accessed from various points of views by optionally switching the above described keyword view, thread view, and an author view.

Described below in detail are the preferred embodiments capable of displaying in the above described methods according to the present invention.

Figure 3:
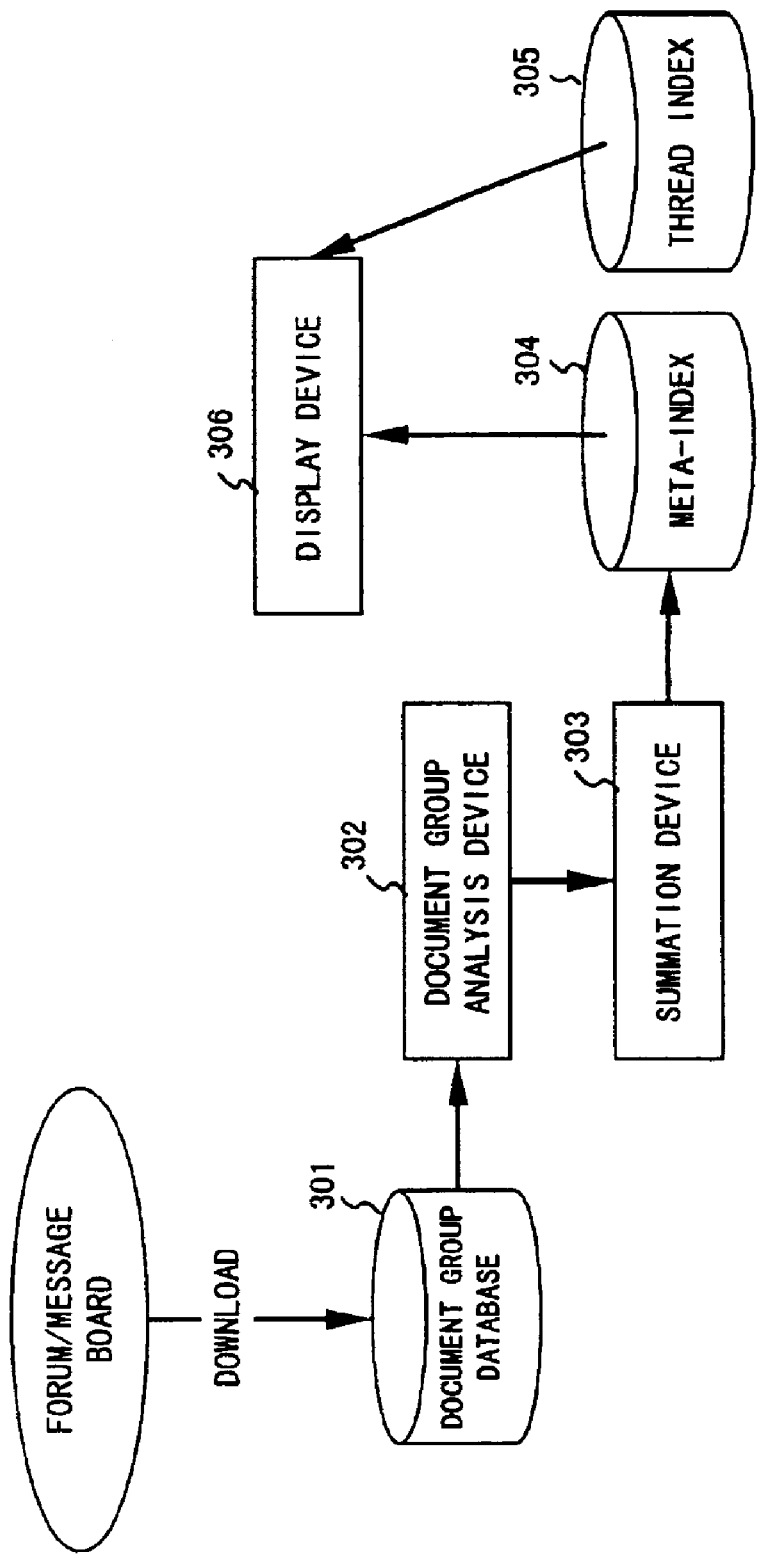
FIG. 3 shows the configuration (1) of the system according to a preferred embodiment of the present invention.

FIGS. 3 and 4 show configurations of the systems according to the preferred embodiments of the present invention.

The group of documents in the forum/message board are accumulated as a document group database 301 in a predetermined server computer.

A document group analysis device 302 analyzes a group of documents contained in each set of document corresponding to each message board in the document group database 301.

A summation device 303 generates a meta-index 304, a thread index 305, and an indexed file 404 based on the analysis result from the document group analysis device 302.

A display device 306 displays a group of documents in any of the keyword view, thread view, and author view formats through the meta-index 304 and the thread index 305.

A character string retrieval device 405 retrieves each document forming part of the set of documents in the document group database 301 using the indexed file 404 according to a user-specified word to be retrieved. display device 306 reflects the retrieval result on the keyword view or the thread view and displays the result.

The display device 306 displays a group of documents in any format of the keyword view, thread view, and author view using the meta-index 304 and the thread index 305.

The document group analysis device 302 comprises a format analysis unit 401, a structure analysis unit 402, and a contents analysis unit 403.

The format analysis unit 401 extracts a document number, title, name of author, date, and reference document number from a header portion of each document having the data structure shown in FIG. 2 forming part of the set of documents in the document group database 301, computes the number of lines of the contents portion of each document, and enters them in the meta-index 304 having the data structure shown in FIG. 5 through the summation device 303.

The structure analysis unit 402 divides each document into groups of documents in thread units based on a document number and a reference document number extracted by the format analysis unit 401 from each document, and generates the thread index 305 which is a reference list of documents forming each thread through the summation device 303.

Figure 6:
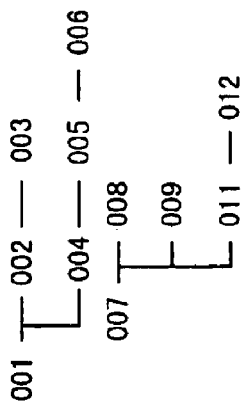
FIG. 6 shows the structure of thread-indexed data.

FIG. 6 shows the data structure of the thread index 305.

A list showing for each thread a root document number, the number of documents, and the structure of a thread is entered. The list is represented as follows.

(parent document number child document number/sub-tree child document number/sub-tree . . . )

The portion 'child document number/sub-tree' can further include a child list recursively.

Each reference represented in each of the listings of the two threads shown in FIG. 6 is indicated to the right of the list.

The structure analysis unit 402 further divides groups of documents forming an analyzed thread into groups of sub-documents having the same titles, assigns a color number to each of the groups of sub-documents, and enters color numbers assigned to the sub-document group of a document in an entry of the meta-index 304 having the data structure shown in FIG. 5 corresponding to the document in each sub-document.

The contents analysis unit 403 combines a group of documents forming each thread divided by the structure analysis unit 402 in a single document file, and extracts a keyword from the combined documents. A technology of extracting a keyword from a Japanese document can be found in various well-known technologies. To extract a keyword from a Japanese document with higher precision, a character which becomes a noise is removed through a pattern matching. Additionally, for example, only the predetermined number of higher order keywords are extracted.

The keyword of each thread extracted by the contents analysis unit 403 is entered in an entry of the meta-index 304 having the data structure shown in FIG. 5 corresponding to the root document of the thread through the summation device 303.

The contents analysis unit 403 extracts an indexed word contained in a keyword extracted for each thread, and generates the indexed file 404 having the data structure shown in FIG. 7 through the summation device 303.

The indexed file 404 is referred to by the character string retrieval device 405 as described above.

Detailed Explanation of the Document Group Analysis Device 302

FIG. 8 is a flowchart showing the control operations realized by the format analysis unit 401 and the structure analysis unit 402 in the document group analysis device 302 shown in FIG. 4.

The format analysis unit 401 reads document data in line units from a new document file newly entered from the document group database 301, and extracts the document number, title, name of an author, date, and reference number from the header portion (refer to FIG. 2) of the document file (loop in steps 801, 802, 803, and back to 801).

When the format analysis unit 401 completes extracting the data from the header portion, it generates a new entry in the meta-index 304 having the data structure shown in FIG. 5 through the summation device 303, and enters in the entry the extracted document number, title, name of an author, date, and reference document number (steps 802 and 804).

Then, the format analysis unit 401 reads document data in line units from the contents portion (refer to FIG. 2) after the header portion in the above described new document file, and counts the number of lines in the contents portion until the end of the file (EOF) is detected (loop in steps 805, 806, 807, and back to 805).

When the end of the file is detected, the format analysis unit 401 enters the number of lines counted up to the current point through the summation device 303 in the contents portion in the entry, corresponding to the document number of the new document being processed, in the meta-index 304 having the data structure shown in FIG. 5 (steps 806 and 808).

In the above described line number counting process, the line recited from another document (for example, a line starting with '>') can be designed not to be counted in the line number counting process so that the number of lines actually related to the message can be counted in the current document.

Then, control is passed to the structure analysis unit 402, and the structure analysis unit 402 first enters the document number of the new document being processed in the thread index 305 having the data structure shown in FIG. 6 through the summation device 303 (step 809).

FIG. 9 is a flowchart showing the operations entered in step 809.

First, the structure analysis unit 402 determines whether or not the new document being processed is a root document of a certain thread (step 901). Practically, when no reference document number can be detected in a new document being processed in the loop in steps 801 to 803 shown in FIG. 8, the structure analysis unit 402 determines that the document is a root document.

When the structure analysis unit 402 determines that a new document being processed is a root document of a certain thread, it generates a new entry in the thread index 305 through the summation device 303, and enters the document number of the new document being processed in the entry as a root document number (steps 901 and 902).

The structure analysis unit 402 initializes the number of documents in the above described entry to 1 after the process in step 902 (step 906), and terminates the process in step 809 shown in FIG. 8.

When the structure analysis unit 402 determines that a new document being processed is not a root document of a certain thread, it determines whether or not a list exists in an entry in the thread index 305 containing the reference document number, which is the parent document number of the list, extracted from the header portion of the new document being processed (step 901 and 903).

If the structure analysis unit 402 determines that a list having as a parent document number a reference document number extracted from the header portion of a new document being processed exists in the above described entry, then the structure analysis unit 402 enters the document number extracted from the header portion of the new document being processed as a child document number of the list (steps 903 and 905).

If the structure analysis unit 402 determines that a list having as a parent document number a reference document number extracted from the header portion of a new document being processed does not exist in the above described entry, then the structure analysis unit 402 generates in the entry a list having the reference document number as a parent document number, and enters the document number extracted from the header portion of the new document being processed as a child document number of the list (steps 903 through 905).

After the process in step 905, the structure analysis unit 402 updates (increments by 1) the number of the documents in the above described entry (step 906), and terminates the process in step 809 shown in FIG. 8.

Figure 10:
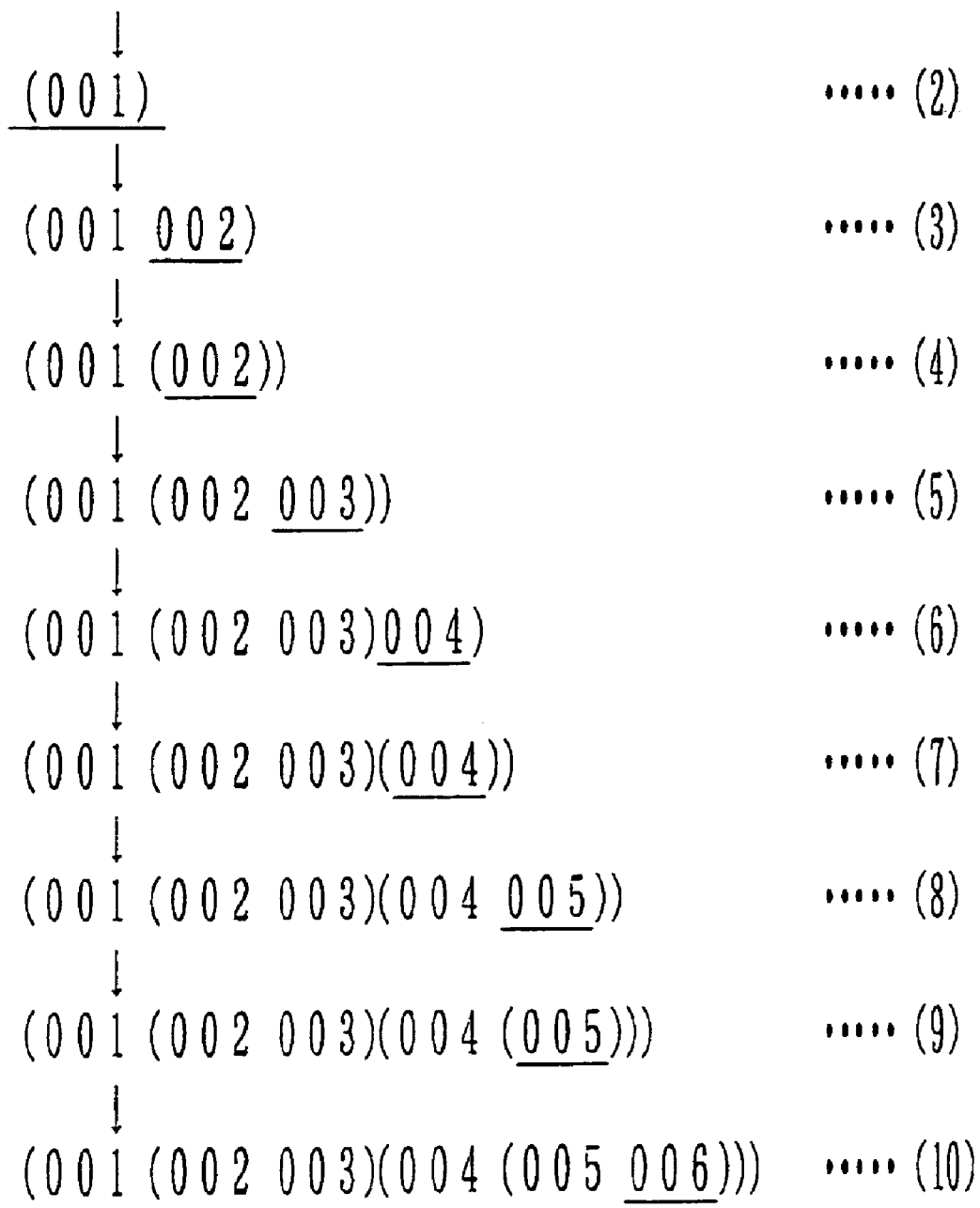
FIG. 10 illustrates the operations when an entry of a document number is made in the thread index of a document number.

A practical example of the control operation realized according to the flowchart of the operations shown in FIG. 9 is explained by referring to FIG. 10. FIG. 10 shows the process of generating the list of entries of the thread whose root document number is 001 in the thread index 305 shown in FIG. 6.

When a root document having the document number 001 is processed, a new entry is generated in the thread index 305 by performing the processes in steps 901 and 902 in FIG. 9, the document number 001 is entered as a root document number in the entry ((1) in FIG. 10), and the number of documents of the above described entry is initialized to 1.

Next, after a list having as a parent document number the reference document number 001 extracted from the document having the document number 002 is generated in the entry of the root document number 001 in the thread index 305 by performing the processes in steps 901, 903, 904, 905, and 906 shown in FIG. 9 when the document having the document number 002 is processed ((2) in FIG. 10), the document number 002 is entered as a child document number of the list (underlined portion of (3) shown in FIG. 10), and the number of documents in the above described entry is updated into 2.

Next, after a list having as a parent document number the reference document number 002 extracted from the document having the document number 003 is generated in the entry of the root document number 001 in the thread index 305 by performing the processes in steps 901, 903, 904, 905, and 906 shown in FIG. 9 when the document having the document number 003 is processed (underlined portion of (4) in FIG. 10), the document number 003 is entered as a child document number of the list (underlined portion of (5) shown in FIG. 10), and the number of documents in the above described entry is updated into 3.

Next, the document number 004 is entered as a child document number of the list (underlined portion of (6) shown in FIG. 10) having as a parent document number the reference document number 003 extracted from the document having the document number 004 in the entry of the root document number 001 in the thread index 305 by performing the processes in steps 901, 903, 904, 905, and 906 shown in FIG. 9 when the document having the document number 004 is processed, and the number of documents in the above described entry is updated into 4.

Next, after a list having as a parent document number the reference document number 004 extracted from the document having the document number 005 is generated in the entry of the root document number 001 in the thread index 305 by performing the processes in steps 901, 903, 904, 905, and 906 shown in FIG. 9 when the document having the document number 005 is processed (underlined portion of (7) in FIG. 10), the document number 005 is entered as a child document number of the list (underlined portion of (8) shown in FIG. 10), and the number of documents in the above described entry is updated into 5.

Finally, after a list having as a parent document number the reference document number 005 extracted from the document having the document number 006 is generated in the entry of the root document number 001 in the thread index 305 by performing the processes in steps 901, 903, 904, 905, and 906 shown in FIG. 9 when the document having the document number 006 is processed (underlined portion of (9) in FIG. 10), the document number 006 is entered as a child document number of the list (underlined portion of (10) shown in FIG. 10), and the number of documents in the above described entry is updated into 6.

After the above described process in step 809 shown in FIG. 8, the structure analysis unit 402 determines the color number for the new document being processed, and performs the process of entering the color number in the entry corresponding to the document number of the above described new document in the meta-index 304 having the data structure shown in FIG. 5 (step 810 shown in FIG. 8).

Figure 11:
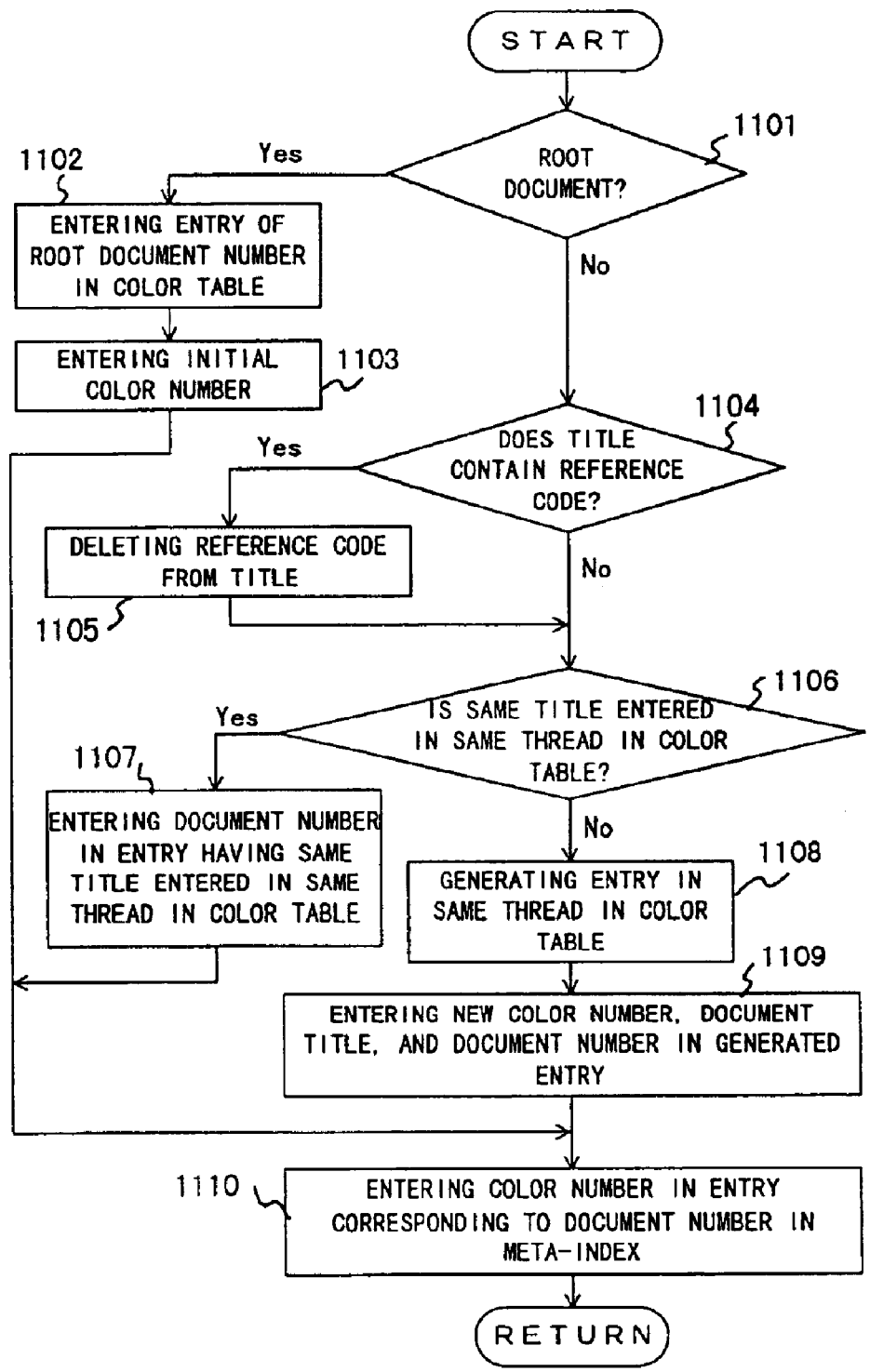
FIG. 11 is a flowchart showing the operations of entering color numbers.

FIG. 11 is a flowchart showing the entry operation in step 810. In the entry operation, a color table having the data structure shown in FIG. 12 is used. This table is stored in the storage device not shown in the attached drawings.

First, the structure analysis unit 402 determines whether or not the new document being processed is a root document of a certain thread (step 1101). Practically, the structure analysis unit 402 determines that a new document being processed is a root document when no reference document number is detected in the document in the loop in steps 801 through 803 shown in FIG. 8.

When the structure analysis unit 402 determines that the new document being processed is a root document of a certain thread, the entry corresponding to the document number of the root document is entered in a color table having the data structure shown in FIG. 12, and the document number and the title extracted from the new document being processed (refer to step 804 shown in FIG. 8) and the initial color number are entered in the entry (steps 1101, 1102, and 1103). In an example shown in FIG. 12, an entry corresponding to the color number #1 of the root document number 001 is entered, the title becomes a main topic, and only the root document number 001 is initially entered in the document number field of the entry.

Then, the structure analysis unit 402 enters an initial color number entered in step 1103 in the entry corresponding to the document number of the above described new document in the meta-index 304 having the data structure shown in FIG. 5 (steps 1103 and 1110), thereby terminating the process in step 810 shown in FIG. 8.

When the structure analysis unit 402 determines that a new document being processed is not a root document of a certain thread, it further determines whether or not the title extracted from the new document being processed (refer to step 804 shown in FIG. 8) contains a reference code such as 'Re:', etc. (steps 1101 and 1104).

When the structure analysis unit 402 determines that the title extracted from the new document being processed contains a reference code, the reference code is deleted from the title (steps 1104 and 1105). When the structure analysis unit 402 determines that the title extracted from the new document being processed does not contain a reference code, the process in step 1105 is not performed.

Then, the structure analysis unit 402 determines whether or not the same title that does not contain the reference code and has been extracted from the new document being processed has been entered in any of the entries corresponding to the thread to which the new document being processed in the color table having the structure shown in FIG. 12 belongs (step 1106). Since the thread to which the new document being processed belongs and the root document number are detected when the entry in the thread index 305 having the data structure shown in FIG. 6 is determined, the entry in the color table is determined from the root document number. For example, when the new document being processed has the document number 002, an entry belonging to the root document number 001 is detected in the color table shown in FIG. 12.

When the structure analysis unit 402 determines that the same title that does not contain the reference code and has been extracted from the new document being processed has been entered in any of the entries corresponding to the thread to which the new document being processed in the color table having the structure shown in FIG. 12 belongs, the structure analysis unit 402 enters the document number of the new document being processed in the document number field of the entry (steps 1106 and 1107). For example, when the new document being processed has the document number 002, the document number 002 is entered in the document number field of the entry belonging to the root document number 001 and having an entered color number #1 in the color table shown in FIG. 12.

Then, in the entry corresponding to the document number of the above described new document in the meta-index 304 having the data structure shown in FIG. 5, the structure analysis unit 402 enters the color number set in the entry in the color table entered in step 1107 (steps 1107 and 1110), thereby terminating the process in step 810 shown in FIG. 8.

When the structure analysis unit 402 determines that the same title that does not contain the reference code and has not been entered in any of the entries corresponding to the thread to which the new document being processed in the color table having the structure shown in FIG. 12 belongs, a new entry corresponding to the above described thread in the color table is generated (step 1108), and a new color number in the thread, and a document number and title (step 804 shown in FIG. 8) extracted from the new document being processed are entered in the generated entry (steps 1106, 1108, and 1109). For example, when the new document being processed has the document number 003, a new entry belonging to the root document number 001 is generated in the color table shown in FIG. 12, and the color number #2, the title of the document having the document number 003, and the document number 003 are entered in the generated entry. This title becomes a sub-topic 1 to the main topic which is the title of the root document number 001.

Then, in the entry corresponding to the document number of the above described new document in the meta-index 304 having the data structure shown in FIG. 5, the structure analysis unit 402 enters a new color number set in the new entry in the color table in step 1109 (steps 1109 and 1110), thereby terminating the process in step 810 shown in FIG. 8.

The contents analysis unit 403 combines a group of documents forming each thread as a combined document file as described above by referring to the thread index 305 having the data structure shown in FIG. 6, and extracts a keyword from the combined documents. As a result, the extracted keyword of each thread is entered in the entry of the meta-index 304 having the data structure shown in FIG. 5 corresponding to the root document of the thread.

Detailed Explanation About the Display Device 306

As described above, the display device 306 can display a group of documents in the display format of the keyword view, the thread view, or the author view using the meta-index 304 having the data structure shown in FIG. 5 and the thread index 305 having the data structure shown in FIG. 6.

In this embodiment, if the system shown in FIG. 4 is designed to be connected to a Web server for controlling the display of a home page, then a user logs in a specific message board of a specific forum by connecting a Web browser application in the terminal at hand such as a personal computer, etc. to the above described Web server, and then switches and displays the keyword view, the thread view, or the author view by clicking a predetermined GUI (graphic user interface) button using a mouse, etc.

To be more practical, the display device 306 functions as, for example, a CGI (common gateway interface) application for a Web server, generates document data in an HTML (hyper text markup language) representing each of the keyword view, thread view, and author view, etc. in response to a user request received through the Web server, and transmits the generated data to the Web server. When the Web server returns the HTML document data to the user through a computer network such as the Internet, etc., the above described view is displayed on the Web browser application on the user terminal unit.

First the operations of displaying a keyword view realized by the display device 306 are described below.

In the keyword view described above, a keyword extracted from a group of documents forming each thread is displayed in the display format shown in FIG. 25 together with the number of documents in the group of documents and the title of the thread.

FIG. 13 is a flowchart showing the operations of displaying a keyword view performed by the display device 306.

First, the display device 306 reads a file of the meta-index 304 having the data structure shown in FIG. 5 (step 1301).

Then, the display device 306 retrieves an entry in which a root document is entered while reading data entry by entry from a file in the meta-index 304 (loop in steps 1301, 1302, and back to 1301). It is determined whether or not the root document of each entry has been entered.

When the display device 306 detects an entry whose root document has been entered, it converts the root document number into an anchor tag whose URL (Uniform Resource Locator), that is, united address information for an application for displaying the root document in the document group database 301 corresponding to the root document number, is specified as a value of an HREF (Hypertext REFerence) attribute (steps 1302 and 1303).

Then, the display device 306 obtains the number of documents (number of child documents) contained in a thread by referring to the entry corresponding to the above described root document number in the thread index 305 having the data structure shown in FIG. 6 (step 1304).

The display device 306 extracts a title (main topic) and a keyword from an entry whose root document has been entered in the meta-index 304 having the data structure shown in FIG. 5, and generates HTML table document data containing as one table record the above described title and keyword, a root document number in the anchor tag format converted in step 1303, and a data string comprising the number of child documents obtained in step 1304 (step 1305).

Next, the display device 306 generates the HTML table document data for each thread by repeatedly performing a series of the above described processes in steps 1301 through 1305 until the end of file (EOF) is detected in the file of the meta-index 304 (steps 1306 and 1301).

When the display device 306 detects the end of file (EOF) in the file of the meta-index 304 (yes as the result of the determination in step 1306), it transmits the finally obtained HTML table document data to the Web server, and terminates the operations of displaying a keyword view. As a result, a keyword view is displayed in a table format shown in FIG. 25 on the Web browser application in the user terminal unit.

A user can easily find a thread probably containing a necessary document in various document sets according to a keyword of each thread in a keyword view.

The user can immediately access a root document of a desired thread by pointing to an anchor corresponding to the root document and clicking a mouse button of a mouse device, etc.

In the above described operation of displaying a keyword view, the table records of each thread can be displayed in various colors for a number of child documents so that the user can recognizes the number of messages at one glance.

Described below are the operations of displaying a thread view realized by the display device 306.

In the thread view, as described above, a group of documents forming each thread are displayed in the display format shown in FIG. 26 in which a user can recognize the reference, title, name of the author, and the number of lines of a document at a glance.

In FIG. 26, the reference between threads and the transition of topics are displayed by a colored tree. A node of each tree corresponds to each document, and is displayed in the following format using the leading characters (2 bytes) of the name of the author of the document and the number of lines of the document.

name of author [number of lines]

Symbols such as '*', '+', '=', '·', etc. are added before and after each node. The meanings of these symbols are listed as follows.

'*' A document marked with this symbol is a root document.

'+' A document referred to by the document marked with this symbol is also referred to by another document.

'=' There is a document which refers to the document marked with this symbol.

'·' There are no documents which refer to the document marked with this symbol.

In FIG. 26, the 'Main Topic' is followed by the title of the root document of the thread, and the 'Sub Topic' is followed by the title other than the root document in the thread. Each title is uniquely colored, and a node corresponding to the document having the same title (excluding a reference code) is displayed in the same color as the title.

Thus, the user can understand the structure of the entire thread and the transition of topics in a thread.

Furthermore, each node is displayed as an anchor so that the user can immediately access the document corresponding to the node by pointing to each node and clicking a mouse button, etc.

Figure 14:
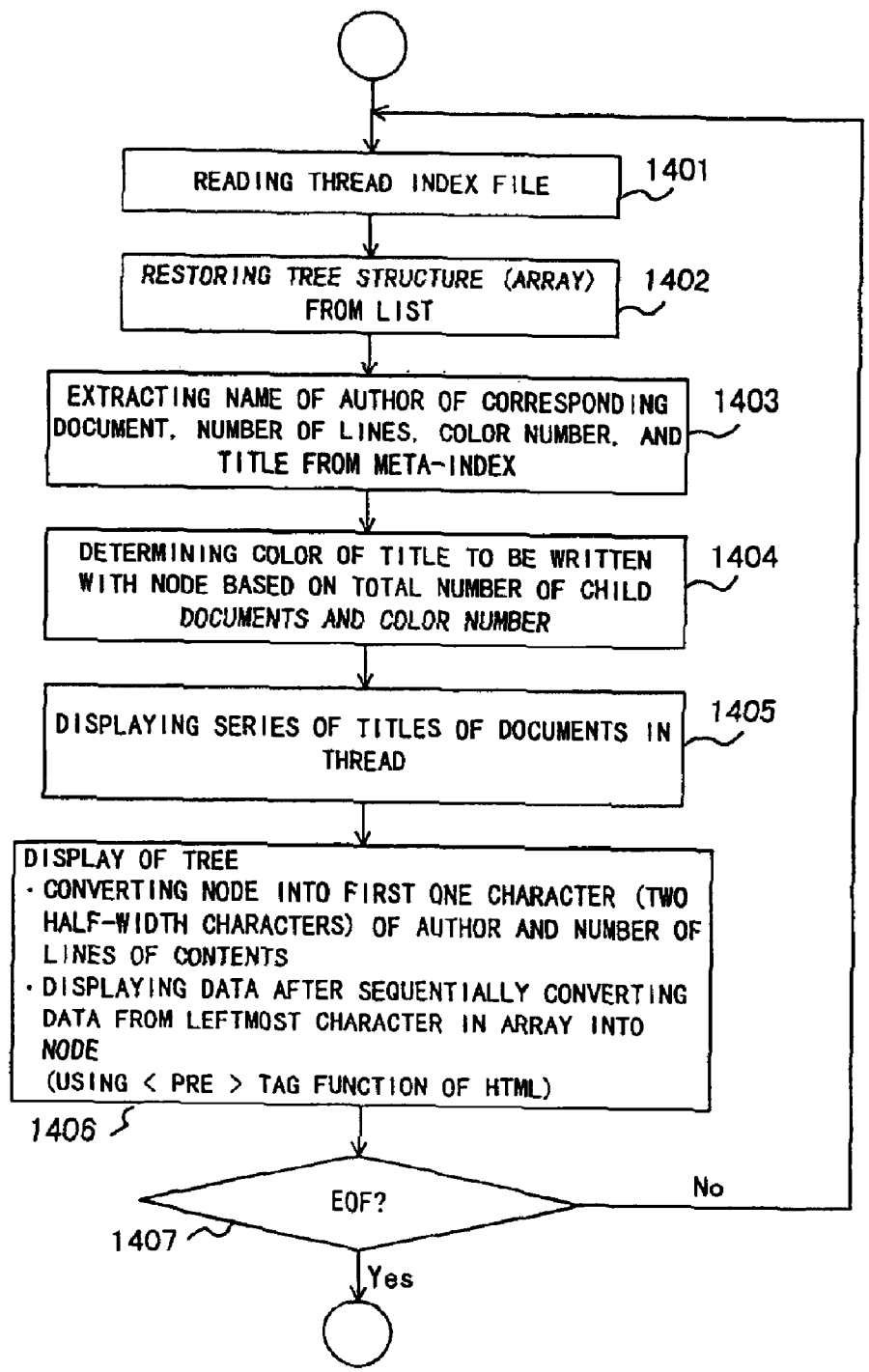
FIG. 14 is a flowchart showing the operation of a thread view.

FIG. 14 is a flowchart showing the operations of displaying a thread view performed by the display device 306.

First, the display device 306 reads a list of one entry (one line) corresponding to one thread, and the number of documents contained in the thread from the file of the thread index 305 having the data structure shown in FIG. 6 (step 1401). For example, in the thread index 305 having the data structure shown in FIG. 6, the following list corresponding to the root document number 001 is read, and '6' is read as the number of documents.

(001 (002 003)(004 (005 006)))

Next, the display device 306 restores, for example, the tree structure of the thread indicated to the right of the table shown in FIG. 6 (step 1402). To represent the tree structure, the display device 306 generates the array data as shown in FIG. 15.

Then, the display device 306 extracts an entry of the meta-index 304 having the data structure shown in FIG. 5 corresponding to a document number forming each node of the read list, and extracts from the entry the name of the author, the number of lines, the color number, and the title (step 1403). The extracted data are stored corresponding to respective nodes.

Based on the number of the documents read in step 1401 and the color number of each node extracted in step 1403, the display device 306 determines the color of each title displayed at the head of the thread view (step 1404). This operation is realized as an operation of mapping actual colors for respective color numbers.

Then, the display device 306 generates an HTML document for display of the title of the root document contained in a thread and other titles preceded by the 'Main Topic:' and the 'Sub Topic:' In this case, each title is sequentially read from each entry belonging to the above described thread of the color table shown in FIG. 12 and managed by the above described structure analysis unit 402. Simultaneously, each color determined in step 1404 is computed from the number of each color sequentially read, and the display in each color is sequentially specified. Each color is specified by a color specification instruction of an HTML document (<font color=> tag, etc.).

Finally, the display device 306 generates an HTML document for display of a tree structure by sequentially processing data from the document number of the leftmost node forming part of the array data indicating the tree structure of the thread restored in step 1402 (step 1406). In this case, as described above, the display device 306 converts the document number of each node in the tree structure into the following display data comprising the leading character (for example, 2 bytes) of the name of the author of a document corresponding to the node and the number of the lines of the document based on the name of the author, the number of lines, and the color number extracted in step 1403, and then generates HTML document data for display of the display data in a color corresponding to the color number of the node. The correspondence between a color number and an actual color depends on the correspondence determined in step 1404. Furthermore, as described above, the display device 306 generates HTML document data for display of symbols such as '*', '+', '=', '·', etc. before or after the above described display data corresponding to each node based on the connection of the data. To display the tree structure in the format as is, a preformatting tag <PRE>, which is a control tag in the HTML, is used. Furthermore, the above described display data for each node is generated as an anchor tag with which the URL to the application for display of the document data in the document group database 301 corresponding to each node is specified as a value of the HREF attribute.

Then, the display device 306 generates the view data for each thread by repeatedly performing a series of the above described processes in steps 1401 through 1406 until the end of file (EOF) is detected in the file of the thread index 305 (steps 1407 and 1401).

When the display device 306 detects the end of file (EOF) in the file of the thread index 305 (yes as the result of the determination in step 1407), it transmits the finally obtained HTML table document data to the Web server, and terminates the operations of displaying a thread view. As a result, a thread view is displayed in a format shown in FIG. 26 on the Web browser application in the user terminal unit.

Described below is the operation of displaying an author view realized by the display device 306.

As described above, in the author view, the titles of documents are classified into author (author) units, and the authors are sorted in order from the highest frequency. Each author is displayed with his or her messages arranged in order of date. The above described data are displayed in the format shown in FIG. 27.

Figure 16:
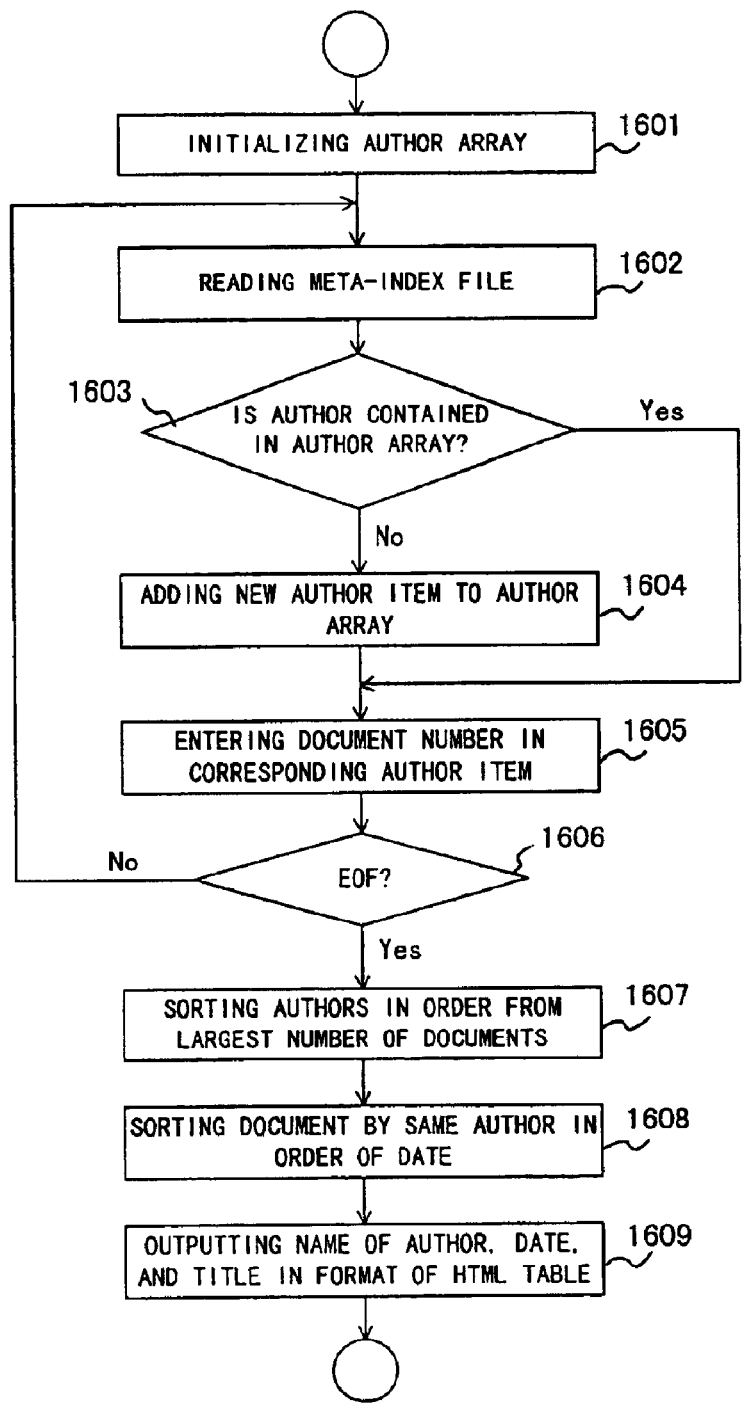
FIG. 16 is a flowchart showing the operations of an author view.

FIG. 16 is a flowchart showing the operations of displaying the author view realized by the display device 306.

The display device 306 uses the author array data having the data structure shown in FIG. 17 to realize the author view. Then, the display device 306 initializes the author array data when the display of the author view is started (step 1601).

Next, the display device 306 reads data of one entry from a file of the meta-index 304 having the data structure shown in FIG. 5 (step 1602).

Then, the display device 306 determines whether or not the author having the name extracted from the entry is an author who is included in the author array data (step 1603).

If the author having the name extracted from the entry is an author who is not included in the author array data, then the display device 306 adds a new author item to the author array data (steps 1603 and 1604). If the author having the name extracted from the entry is an author who is included in the author array data, then the display device 306 does not perform the process in step 1604.

Next, the display device 306 enters a document number extracted from the above described entry in the corresponding author item in the author array data (step 1605).

Then, the display device 306 enters in the author array data in author units all document numbers entered in the meta-index 304 by repeatedly performing a series of processes in steps 1602 through 1605 until the end of file (EOF) is detected in the file of the meta-index 304.

When the display device 306 detects the end of file (EOF) in the file of the meta-index 304 (no as the result of the determination in step 1606), the author items in the author array data are sorted based on the number of document numbers entered in respective items, that is, the number of message documents of each author (step 1607).

Then, the display device 306 sorts the document numbers in the order of date extracted from corresponding entries in the meta-index 304 in the same author item in the author array data.

Finally, the display device 306 generates HTML table document data for display of the name of an author, the date and the title extracted from the entry in the meta-index 304 corresponding to each document number in an item for each author item of the author array data obtained as a result of the sorting operation in steps 1607 and 1608. Then, the display device 306 transmits the generated data to the Web server and terminates the operation of displaying the author view. As a result, the author view is displayed on the Web browser application of a user terminal in the table format as shown in FIG. 27.

The user can refer to a document in a set of documents (message board) from the viewpoint of an author and a date of a message in the author view.

The user can also refer to the message of an author in time series, and confirm the leader of authors at a glance who uploads many messages.

Other Display Formats of the Display Device 306

Described below are the aspects of displaying operations other than the above described operations of displaying each of the above described views realized by the display device 306.

First, the operation of displaying the contents of the message realized by the display device 306 is explained below.

As described above, the user can immediately access a root document of each thread or a document corresponding to each node, etc. by pointing to an anchor in each thread in the keyword view or an anchor in each node in the thread view and clicking the mouse button, etc.

Figure 18:
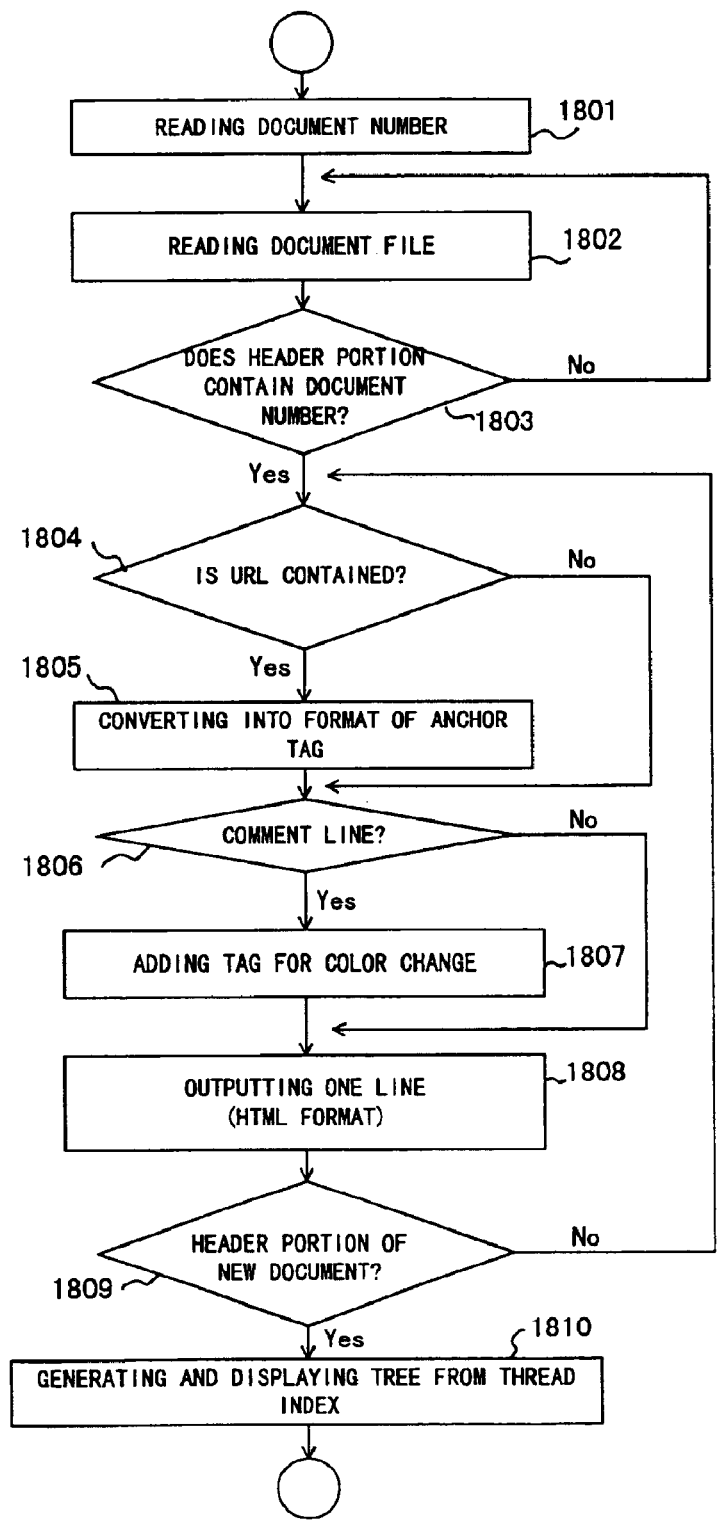
FIG. 18 is a flowchart showing the operations for displaying the contents of a message.

When these operations are performed by the user, the process according to the flowchart shown in FIG. 18 performed by the display device 306 is activated as, for example, a CGI at an instruction from the Web server. In this case, the process is provided with the information having the document number contained in the anchor tag specified by the user.

As a result, after the display device 306 reads the information about the above described document number (step 1801), it reads only the document file from the document group database 301 until it reads the document file containing the read document number described above in the header portion (loop in steps 1802, 1803, and back to 1802).

When the display device 306 reads a document file containing the read document number described above in the header portion (yes as a result of the determination in step 1803), it reads data line by line from the above described document file in the loop in steps 1804 through 1809 until it reads the header portion of a new document. Then, it converts the data into one line of HTML document data, and outputs the HTML document data to the Web server (step 1808).

In this case, when the data in each line contains the URL for other documents, etc., the display device 306 outputs the data after converting it into an anchor tag specified as a value of an HREF attribute using the above described URL (steps 1804 and 1805).

As a result, the user can jump to other resources by pointing to the anchor in the message being displayed and clicking the mouse button, etc.

When the data in each line is a comment line from another document, the display device 306 adds to the data a tag for a change of color for the data (steps 1806 and 1807).

As a result, the user can recognize a comment line at a glance.

When the display device 306 completes outputting corresponding document data, it generates and outputs the HTML document in the tree structure of a thread containing the above described document, and terminates the operation of displaying the contents of the message (steps 1809 and 1810). This process can be realized as in the above described operation of displaying the thread view according to the flowchart shown in FIG. 14.

As a result of the above described displaying operations, the contents of a message is displayed on the upper half of the display screen, for example, as shown in FIG. 28 on the Web browser application of the user terminal unit. The tree structure of the thread containing the document including the contents of the message is displayed on the lower half of the display screen. On the display screen, an anchor for display of a keyword view and a thread view, an anchor for use in performing retrieval, etc. can be simultaneously displayed as shown in FIG. 28.

The function of switching the views allows the documents (messages) in a message board optionally at a request from the user, for example, from a keyword view to a thread view, the display of the contents of a message, an author view, the display of the contents of a message, the thread view, . . . , etc.

Figure 19:
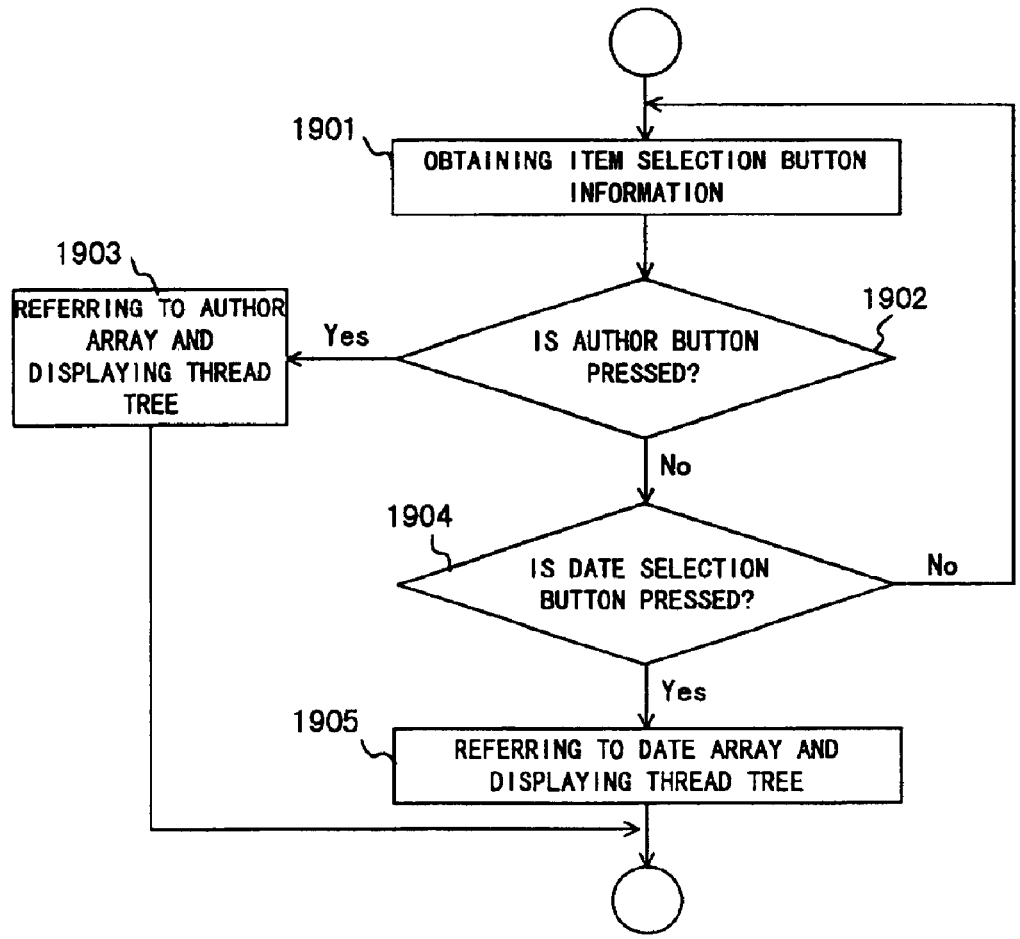
FIG. 19 is a flowchart showing the operations of displaying authors and dates in respective colors.

Described below is the operations of displaying authors and dates in specified colors realized by the display device 306. FIG. 19 is a flowchart showing the above described operation.

First, the display device 306 preliminarily generates the author array data in which document numbers are classified in author items as shown in FIG. 20A, and the date array data in which document numbers are classified in date items as shown in FIG. 20B based on the meta-index 304 and the thread index 305. The detailed explanation of the generating process is omitted here, but the process can be realized as in the process in the flowchart of FIG. 16. Different colors are assigned to author items in the author array data or date items in the date array data. The assignment of color is determined from a total number of authors in each author item or a total number of dates in each date item.

Then, the display device 306 obtains item selection button information based on user specification through a Web server, and determines which has been pressed, an author button or a date selection button (refer to steps 1902 and 1904 shown in FIG. 19).

If the display device 306 determines that the author button has been pressed, the display device 306 generates and outputs the display data for a thread tree by referring to the author array data shown in FIG. 20A (steps 1902 and 1903). This process is realized as in the above described process shown in the flowchart of FIG. 14. In this case, each node of the tree is displayed in a color assigned to the author item in the author array data corresponding to the name of an author corresponding to the node.

When the display device 306 determines that the date selection button has been pressed, it generates and outputs thread tree display data by referring to the date array data shown in FIG. 20B (steps 1904 and 1905). This process is also realized as in the above described process according to the flowchart of FIG. 14. In this case, each node of the tree is displayed in the color assigned to the date item in the date array data corresponding to the date corresponding to the node.

As a result of the above described displaying operations, a tree of a thread uniquely colored for each author is displayed, for example, as shown in FIG. 29 on the Web browser application of the user terminal when the user presses the author button. Therefore, the user can recognize at a glance the documents written by the same author.

Figure 21:
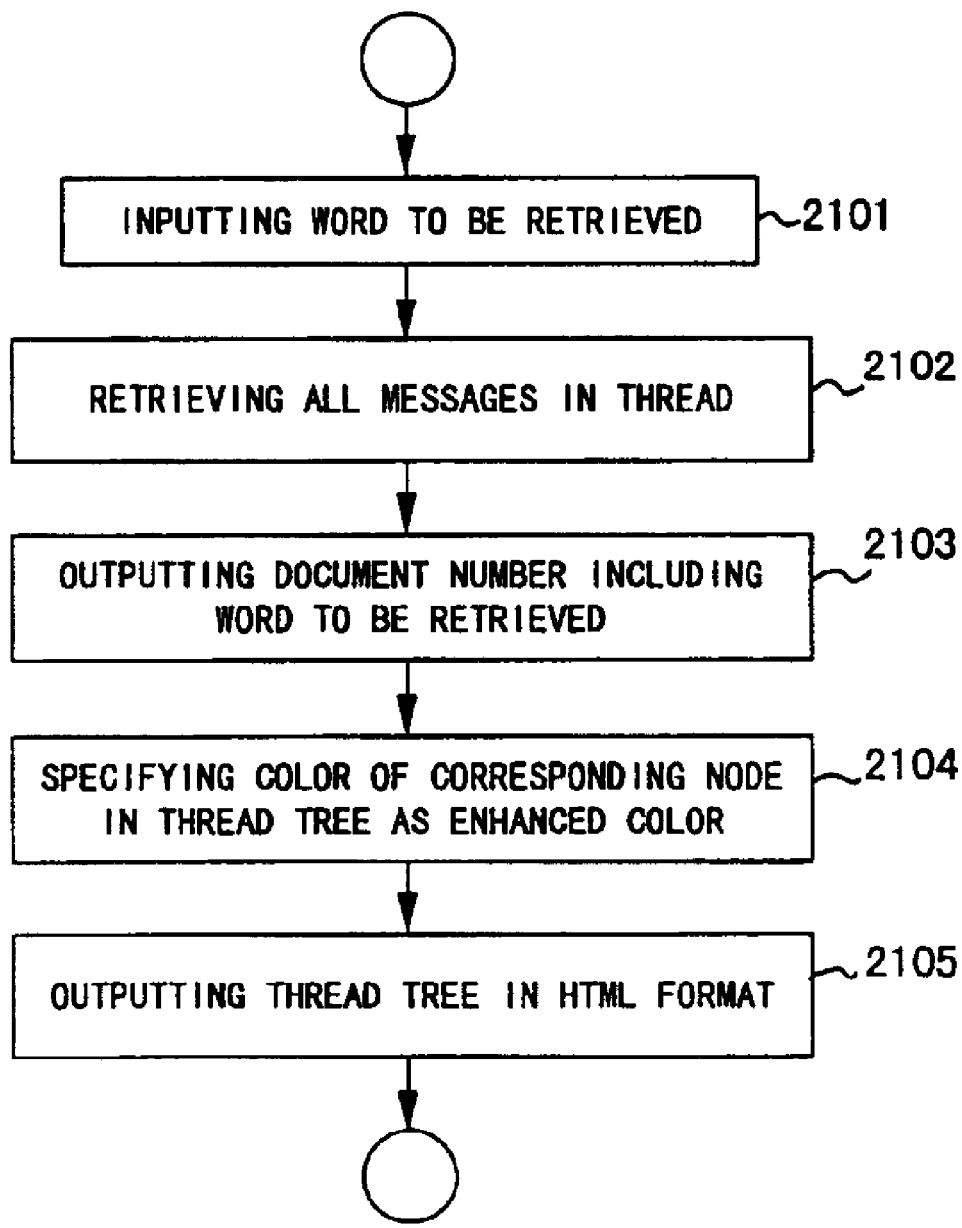
FIG. 21 is a flowchart showing the operations of an enhanced display of a retrieval result using thread views.

Described below is the operation of enhancing the display of the retrieval result using a thread view realized by the display device 306. FIG. 21 is a flowchart showing the operation.

First, the display device 306 generates and outputs the HTML document data for display of a post-retrieval input form screen (step 2101). As a result, a retrieval input form screen as shown in FIG. 30 is displayed on the Web browser application of the user terminal. The user specifies the execution of retrieval by inputting a word to be retrieved in the retrieval input form.

The word to be retrieved is input in the retrieval input form and passed to the character string retrieval device 405 (FIG. 4) through the Web server. The character string retrieval device 405 searches the entire sentences in each document forming part of a thread specified in the document group database 301 using the indexed file 404 for the user-specified word to be retrieved, and outputs the document number containing the word to be retrieved (steps 2102 and 2103).

When the display device 306 receives a document number containing the above described word to be retrieved, it displays the HTML document data in the tree structure of the thread containing the document number in the process according to the flowchart of FIG. 14. In this case, the display device 306 specifies the color of the node containing the above described document number as an enhanced color (steps 2104 and 2105).

As a result, for example, a thread view as shown in FIG. 31 is displayed with enhancement on the Web browser application of the user terminal based on the retrieval result. Thus, the user can recognize the structure of a thread and performs the retrieval.

Described below is the operation of displaying with enhancement a retrieval result using a keyword view realized by the display device 306. FIG. 22 is a flowchart showing the operations.

First, the display device 306 generates and outputs the HTML document data for display of the post-retrieval input form screen as in step 2101 shown in FIG. 21 (step 2201). The user specifies performing retrieval by inputting a word to be retrieved to a retrieval input form.

The word to be retrieved and input to the above described retrieval input form is passed to the character string retrieval device 405 (FIG. 4) through the Web server. The character string retrieval device 405 retrieves all sentences in each document forming part of the message board specified in the document group database 301 using the indexed file 404 by the user specifying a word to be retrieved, and outputs the document number containing the word to be retrieved (steps 2202 and 2203).

When the display device 306 receives the document number containing the above described word to be retrieved, it first refers to the thread index 305 having the data structure shown in FIG. 6 and extracts the root document number corresponding to the entry containing the above described document number (step 2204).

Then, the display device 306 displays the HTML document data for display of the keyword view about a specified message board in he process as shown in the flowchart of FIG. 13. In this case, the display device 306 specifies as an enhanced color the color of the title or the entire display area of the thread corresponding to the root document number extracted in step 2204, and also specifies the color of a keyword as an enhanced color when the displayed keyword contains a word to be retrieved (steps 2205, 2206, and 2207).

Figure 32:
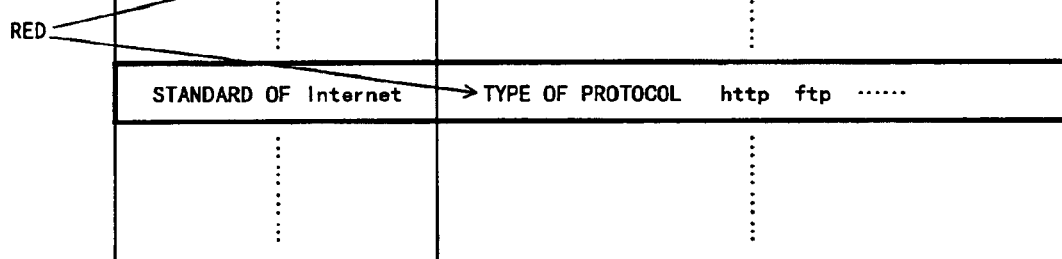
FIG. 32 shows an example of displaying with enhancement a thread containing a character string 'protocol' using a keyword view.

As a result, for example, a keyword view as shown in FIG. 32 is displayed with enhancement on the Web browser application of the user terminal based on the retrieval result. Thus, the user can recognize a thread containing a word to be retrieved at a glance.

The display device 306 can be designed to display the document number as a retrieval result and the corresponding title as a listing as shown in FIG. 33.

Described finally is the operation of displaying a keyword view for each sub-topic realized by the display device 306.

In the above described keyword view, a keyword is displayed for each thread. On the other hand, in the keyword view for each sub-topic, a keyword can be extracted and displayed for each sub-topic in a thread.

In this operation, the display device 306 uses a sub-topic index having the data structure shown in FIG. 24. The sub-topic index has the data structure in which a keyword field is added to the data structure of the color table shown in FIG. 12.

A sub-topic index is used to actually replace the above described color table. Therefore, the contents of the field other than a keyword field in the sub-topic index are preliminarily entered in the above described process in step 810 shown in FIG. 8 performed by the structure analysis unit 402. In this case, there can be an entry obtained corresponding to each of the main topic indicating the title of a root document contained in each root document number (thread) and the sub-topics indicating the titles of other documents in the sub-topic index which is a color table as described above about the process in step 810 shown in FIG. 8. The display device 306 uses the contents of the entries.

Figure 23:
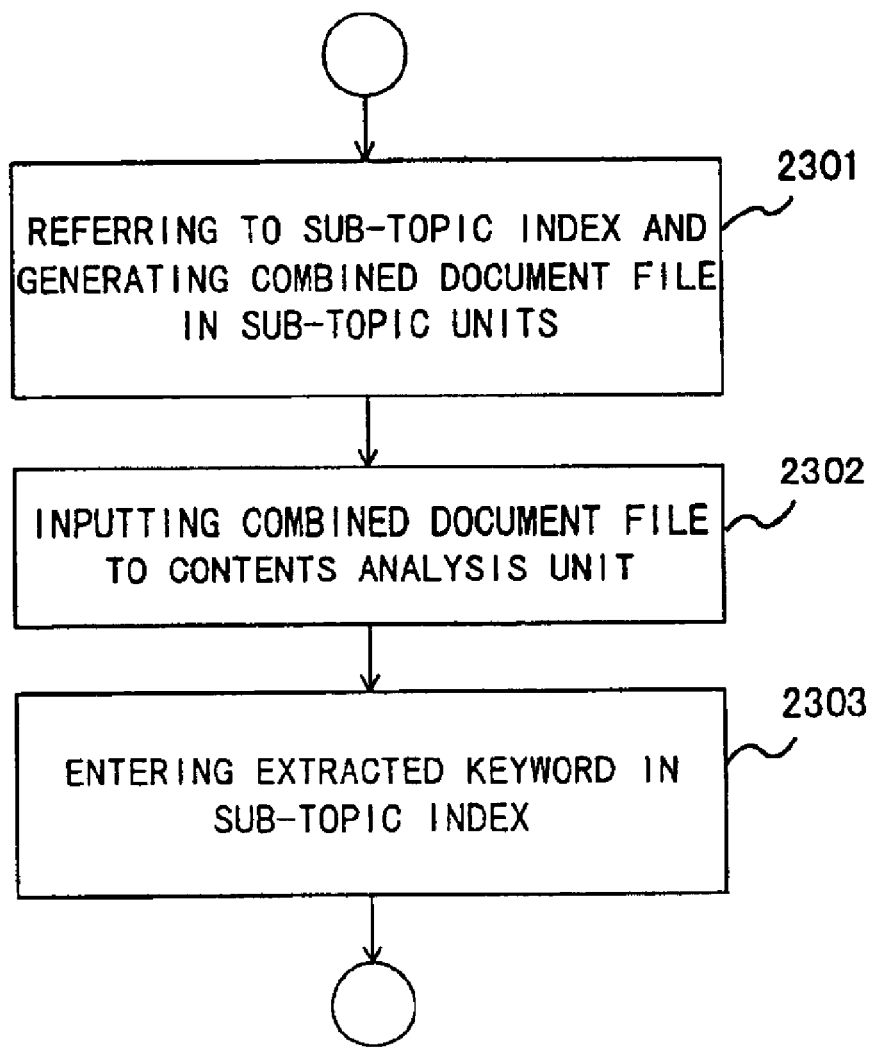
FIG. 23 is a flowchart showing the operations of controlling the extraction of a keyword from a sub-topic.

FIG. 23 is a flowchart showing the operations of controlling the extraction of a keyword from the sub-topic realized by the display device 306.

First, the display device 306 puts groups of documents in each of the combined document files in main topic units and sub-topic units based on the document number entered in each entry contained in each thread in the sub-topic index, and inputs a resultant combined document file in the contents analysis unit 403 (FIG. 4) (step 2302).

The contents analysis unit 403 extracts a keyword for each combined document file, and returns a result to the display device 306. The display device 306 enters the keyword for each combined document file returned from the contents analysis unit 403 in the keyword field of the entry corresponding to the above described combined document file in the sub-topic index (step 2303).

As described above, a keyword is extracted from a group of documents belonging to each thread in main topic and sub-topic units.

Afterwards, the display device 306 generates and outputs the HTML document data for display of a title and a keyword belonging to each title for a thread specified by a user in main topic and sub-topic units for each thread based on the contents of the sub-topic index.

As a result, a keyword view for each sub-topic is displayed in the format as shows in FIG. 34 on the Web browser application of the user terminal. Thus, the user can precisely limit the topics using a keyword.

Other Embodiments of the Present Invention (Second Embodiments)

Described below are other embodiments according to the present invention (hereinafter referred to as the second embodiments).

Functions Realized by the Second Embodiment of the Present Invention

In the second embodiment, the following three functions are realized.

1. Function of Obtaining the Entire Structure of a Thread in a Small Screen

The entire tree structure can be displayed in a predetermined size of screen by curtailing the tree of a thread. The second embodiment is described by referring to the display on a TTY character terminal.

Since one node is displayed in one line on the character terminal, n nodes can be drawn on a n-line screen. The selection standard of a node to be drawn is listed below.

number of child nodes referring to the node number of child nodes referring to the node obtained as a retrieval result node having a title different from the title of a root node or a parent node 2. Function of Estimating the Proceedings of a Topic in a Thread A specific dialogue such as 'question-answer-thanks' is detected, and the information is used for display and retrieval, thereby efficiently accessing information.

To be more practical, according to the second embodiment, a topic pattern in a thread can be extracted by estimating the attribute information (title, author, and reference) of a document and a specific sentence pattern characterizing the contents of a document.

3. Visualization of User's Message Pattern

In network news, the ratio of the number of authors to the number of readers is very small. Even in a large thread, the number of discussing authors is small in many cases. In a specific news group, it is not rare that useful information is issued by a small number of specific persons. Therefore, according to the second embodiment, new views are provided from the viewpoint of users who input messages by appropriately arranging news and threads.

To be more practical, according to the second embodiment, a view is provided from the viewpoint of users based on the input history of a news group and the function of estimating a topic.

Entire Configuration According to the Second Embodiment of the Present Invention FIG. 35 shows the configuration of the second embodiment of the present invention.

First, in the preparation phase prior to retrieval, the following operations are performed.

A document obtaining unit 3502 in a processing unit 3501 obtains a group of documents related in reference through a network, and stores them in a secondary storage device 3503.

A contents estimation unit 3504 generates a display index 3505 based on the contents of documents, the information pertaining to the documents, and the reference among the documents in the group of documents stored in the secondary storage device 3503.

A retrieval engine 3506 generates a retrieval index 3507 based on the document contents of the group of documents stored in the secondary storage device 3503.

For example, in the network news service, documents are input at any time. Therefore, the above described preparation phase is periodically performed, for example, once a day to store the latest group of documents in the secondary storage device 3503.

The following operations are performed in the retrieving process.

Users issue input instructions through an input device 3509. The information to be input includes a retrieval keyword, the type of view for display of a retrieval result, and the size of a view display area.

A view generation unit 3508 calls the retrieval engine 3506 according to the input instruction from the input device 3509 to retrieve a corresponding group of documents in response to the input instruction from the groups of documents stored in the secondary storage device 3503.

The view generation unit 3508 generates a result view for display of the group of documents retrieved by the retrieval engine 3506 using the display index 3505, and outputs it to a display device 3510.

The above described operations are performed based on the dialogue process between users. That is, the users add or change a retrieval keyword on the result being displayed, or switch the result view.

Structure of the Display Index 3505

In the preparation phase prior to retrieval, the following types of indices are generated.

1. User Index

This index is used in managing users, and holds the following information for each entry as shown in FIG. 36.

User ID: user ID (key) corresponding to the entry

Name: user name corresponding to the entry

Abbreviation: abbreviation for the user corresponding to the entry number of messages (number of answers): total number of messages of the user corresponding to the entry in the message board, and the number of answer documents in the Q and A pattern 2. Document Index This index is used in managing information for each document, and holds the following information for each entry as shown in FIG. 37.

Document ID: ID (key) of the document corresponding to the entry

User ID: user ID (key) of the user who generates the document corresponding to the entry Title: title of the document corresponding to the entry Date: generation date of the document corresponding to the entry Number of child and grandchild references: total number of documents referring to the document corresponding to the entry Path to root: path from the leading message referred to by the document corresponding to the entry to the document Identification number of title: number indicating the order of the title of the document corresponding to the entry in the thread (group of documents) containing the document Message type: information indicating the type of the document, that is, Q (question), A (answer), or T (thanks), when the document corresponding to the entry is contained in the Q and A pattern 3. Thread Index This index is used in managing the information for each thread, and holds the following information for each entry as shown in FIG. 38.

Thread ID: ID (key) of the thread corresponding to the entry

Tree structure of thread: reference of a document, represented in the document ID list, in the thread corresponding to the entry Number of documents: total number of documents in the thread corresponding to the entry Number of authors: number of authors of the documents in the thread corresponding to the entry UID of largest number of messages: ID of the user who issues the largest number of messages in the thread corresponding to the entry Contents list: pattern ID list of the Q and A pattern, the discussion pattern, and the chat pattern. The QA_ID which is the pattern ID of the Q and A pattern is entered in an entry in the QA index described later. The DS_ID which is the pattern ID of the Discussion pattern is entered in an entry in the DISCUSS index described below. The CT_ID which is the pattern ID in the Chat pattern is entered in an entry in the CHAT index.

4. QA Index

This index is used in managing the information of the Q and A, and holds the following information for each entry as shown in FIG. 39.

QA_ID: ID (key) of the Q and A pattern corresponding to the entry

Question: field for storing a document ID corresponding to the Q (question) document forming part of the Q and A pattern corresponding to the entry Answer: field for storing a document ID string corresponding to the group of A (answer) documents forming part of the Q and A pattern corresponding to the entry Thanks: field for storing a document ID corresponding to the T (thanks) document forming part of the Q and A Pattern Corresponding to the Entry MaxAnswerUID: field for storing the ID (or an ID string) of a user (or users) who appears the most frequently in the authors of each A (answer) document forming part of the P and A pattern corresponding to the entry, that is, in the authors of the documents corresponding to each document ID in the document ID string entered in the Answer field in the entry Thread ID: ID of a thread containing the Q and A pattern corresponding to the entry. This thread ID is entered in an entry in the thread index.

5. DISCUSS Index

This index is used in managing the information of the Discussion pattern, and holds the following information for each entry as shown in FIG. 40.

DS_ID: ID (key) of the Discussion pattern corresponding to the entry

Message ID list: field for storing a document ID string of a group of documents forming part of the Discussion pattern corresponding to the entry UID: user ID string of a group of documents forming part of the Discussion pattern corresponding to the entry.

ThreadID: ID of a thread containing the Discussion pattern corresponding to the entry. This thread ID is entered in an entry in the thread index.

6. CHAT Index

This index is used in managing the information of the Chat pattern, and holds the following information for each entry as shown in FIG. 41.

CT_ID: ID (key) of the Chat pattern corresponding to the entry

Chat list: field for storing the document ID string of the group of documents forming part of the Chat pattern corresponding to the entry ThreadID: ID of the thread containing the Chat pattern corresponding to the entry. This thread ID is entered in an entry in the thread index.

Configuration and Operation of the Contents Estimation Unit 3504

Described below in detail are the operations of the contents estimation unit 3504 shown in FIG. 35.

As described above, the contents estimation unit 3504 generates the display index 3505, that is, a user index, a document index, a thread index, a QA index, a DISCUSS index, and a CHAT index, based on the document contents, the information pertaining to documents, and the references among the documents of a group of documents stored in the secondary storage device 3503.

Figure 42:
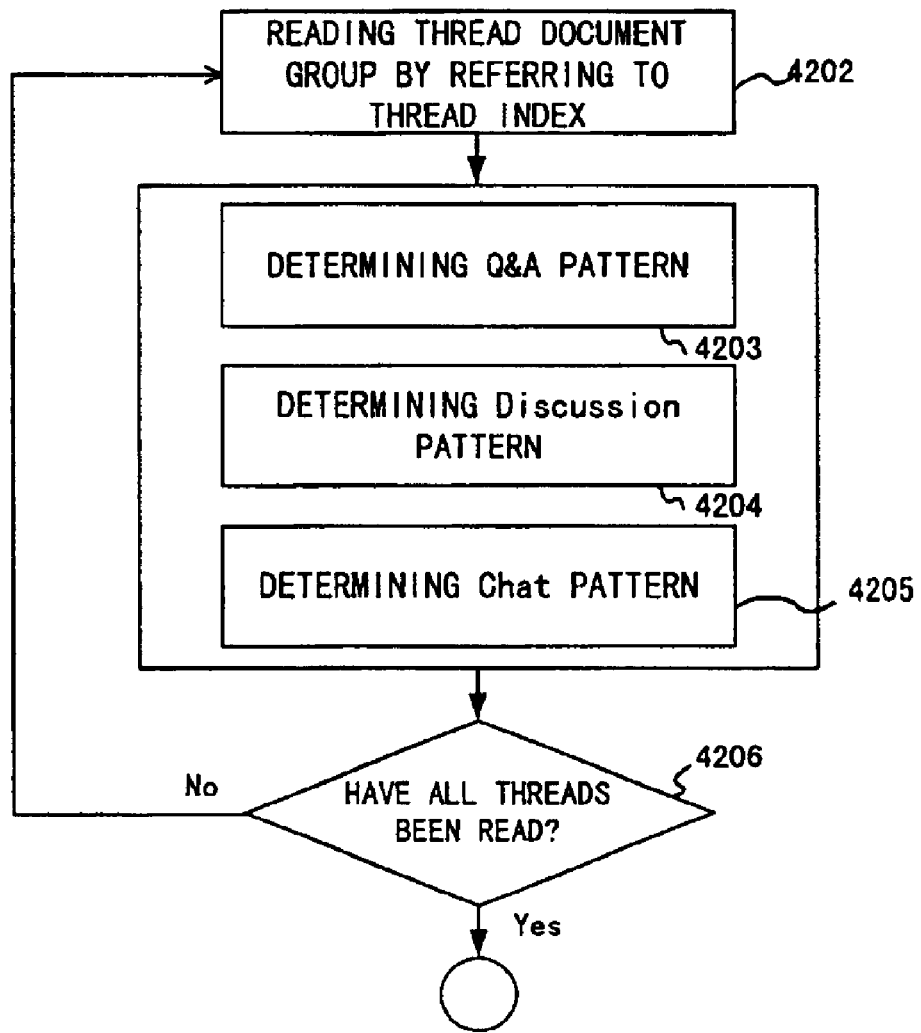
FIG. 42 is a flowchart showing the contents estimation unit.

FIG. 42 is a flowchart showing the operations performed by the contents estimation unit 3504.

First, the document index having the data configuration shown in FIG. 37 and the thread index having the data configuration shown in FIG. 38 are generated (step 4201). The detailed description is omitted here, but the operations are realized by those shown in the flowchart shown in FIGS. 8 and 9. In this case, the above described meta-index corresponds to the document index. Simultaneously, a user index having the data configuration shown in FIG. 36 which relates the user name appearing in each document to the user ID, the abbreviation, and the number of messages (number of answers) is generated.

Next, a thread document group corresponding to each entry is read by referring to each entry in the thread index (step 4202), and the Q and A pattern determining process (step 4203), the Discussion pattern determining process (step 4204), and the Chat pattern determining process (step 4205) are performed for each of the read thread document groups until it is determined (step 4206) that the process of the thread document groups for each entry has been completed.

Figure 43:
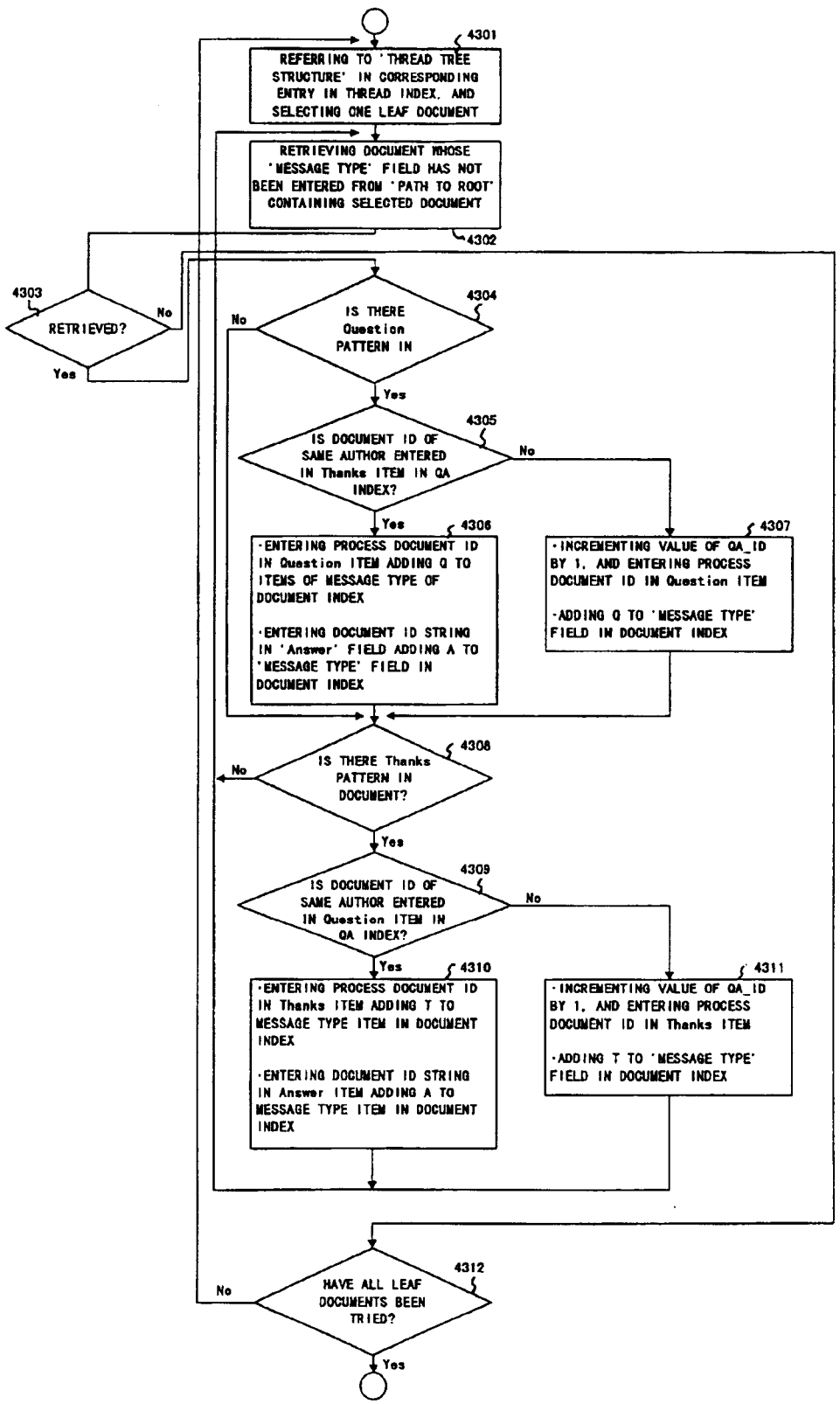
FIG. 43 is a flowchart showing the Q and A pattern determining process.

FIG. 43 is a flowchart showing the Q and A pattern in step 4203 shown in FIG. 42. According to the flowchart, a topic pattern is assumed for each reference pattern in the thread document group.

First, one document ID corresponding to a leaf document (document at the end of a path) is selected by referring to the 'thread tree structure' field of the corresponding entry in the thread index (step 4301).

Next, in the document index, the document ID satisfying the following condition is retrieved from the 'path to root' field in the entry whose document ID selected in step 4301 is contained in the 'document ID' field (step 4302).

(condition) In the document index, the 'message type' field in the entry whose document ID is contained in the 'document ID' field has not been entered yet.

Then, it is determined whether or not the document ID satisfying the above described condition has been detected (step 4303).

If the document ID satisfying the above described condition (hereinafter referred to as a process document ID) is detected and the determination in step 4303 is YES, then the document corresponding to the process document ID is read from the secondary storage device 3503 (FIG. 35), and it is determined whether or not a sentence pattern as shown in FIG. 44 exists in the document (step 4304).

If the determination in step 4304 is NO, then control jumps to step 4308.

If the determination in step 4304 is YES, it is determined whether or not the document ID satisfying the following condition exists in the document IDs entered in the 'path to root' field in the entry, in the document index, referred to in step 4302 (step 4305).

(condition) The document corresponding to the document ID is generated by an author of a process document ID, and the document ID is entered in the 'Thanks' field in an entry in the QA index forming part of the data shown in FIG. 39.

If the determination in step 4305 is YES, a process document ID is added to the 'Question' field in the entry in the QA index referred to in step 4305. In the document index forming part of the data configuration shown in FIG. 37, a symbol 'Q' is added to the 'message type' field in the entry containing the process document ID in the 'document ID' field (step 4306).

Furthermore, in the document ID groups entered in the 'path to root' field in the entry referred to in step 4302 in the document index, the document ID group between the process document ID entered in the 'Question' field and the document ID entered in the 'Thanks' field in the entry in the QA index referred to in step 4305 are added to the 'Answer' field in the entry. Similarly, in the document index having the data configuration shown in FIG. 37, the symbol 'A' is added to the 'message type' field in each entry whose 'document ID' field contains each document ID entered as described above (step 4306).

On the other hand, if the determination in step 4306 is NO, then, in the QA index, an entry having the value of {(maximum value of QA_ID in the index)+1} as the field in the 'QA_ID' field is generated, and the process document ID is entered in the 'Question' field in the entry. In the document index having the data configuration shown in FIG. 37, the symbol 'Q' is entered in the 'message type' field in the entry containing a process document ID in the 'document ID' field (step 4307).

After the process in step 4306 or 4307, or if the determination in step 4304 is NO, it is determined whether or not a sentence pattern as shown in FIG. 45 exists in the document corresponding to the process document ID read from the secondary storage device 3503 (step 4308).

If the determination in step 4308 is NO, then control is passed to step 4302.

If the determination in step 4308 is YES, then it is determined whether or not a document ID satisfying the following condition exists in the document IDs entered in the 'path to root' field in the entry referred to in step 4302 in the document index (step 4309).

(condition) The document corresponding to the document ID is generated by an author of a process document ID, and the document ID is entered in the 'Question' field in an entry in the QA index forming part of the data shown in FIG. 39.

If the determination in step 4309 is YES, a process document ID is added to the 'Thanks' field in the entry in the QA index referred to in step 4305. In the document index forming part of the data configuration shown in FIG. 37, a symbol 'T' is added to the 'message type' field in the entry containing the process document ID in the 'document ID' field (step 4310).

Furthermore, in the document ID groups entered in the 'path to root' field in the entry referred to in step 4302 in the document index, the document ID group between the process document ID entered in the 'Thanks' field and the document ID entered in the 'Question' field in the entry in the QA index referred to in step 4309 are added to the 'Answer' field in the entry. Similarly, in the document index having the data configuration shown in FIG. 37, the symbol 'A' is added to the 'message type' field in each entry whose 'document ID' field contains each document ID entered as described above (step 4310).

On the other hand, if the determination in step 4309 is NO, then, in the QA index, an entry having the value of {(maximum value of QA_ID in the index)+1} as the field in the 'QA_ID' field is generated, and the process document ID is entered in the 'Thanks' field in the entry. In the document index having the data configuration shown in FIG. 37, the symbol 'T' is entered in the 'message type' field in the entry containing a process document ID in the 'document ID' field (step 4311).

After the process in step 4310 or 4311, control is returned to step 4302, and the next document ID is retrieved.

If it is determined in step 4303 that a document ID satisfying the condition in step 4302 cannot be detected after repeating the processes in steps 4302 through 4311, then it is determined whether or not a process on the document ID corresponding to all leaf documents has been performed by referring to the 'thread tree structure' field in the entry being processed in the thread index (step 4312).

If a process on the document ID corresponding to all leaf documents has not been performed and the determination in step 4312 is NO, then control is returned to step 4301, and the topic pattern estimation process corresponding to the next path is repeated.

If a process on the document ID corresponding to all leaf documents has been performed and the determination in step 4312 is YES, then the determination process about the Q and A pattern in step 4203 shown in FIG. 42 is completed.

FIGS. 46 and 47 show an example of a thread structure extracted in the determination process about the Q and A pattern and a corresponding example of a group of documents.

An entry of a user index (refer to FIG. 36) corresponding to the author of the document corresponding to the document ID of the entry assigned the symbol 'A' in the 'message type' field in the document index is referred to. The contents of the 'number of messages (answers)' field in the entry is updated.

Figure 48:
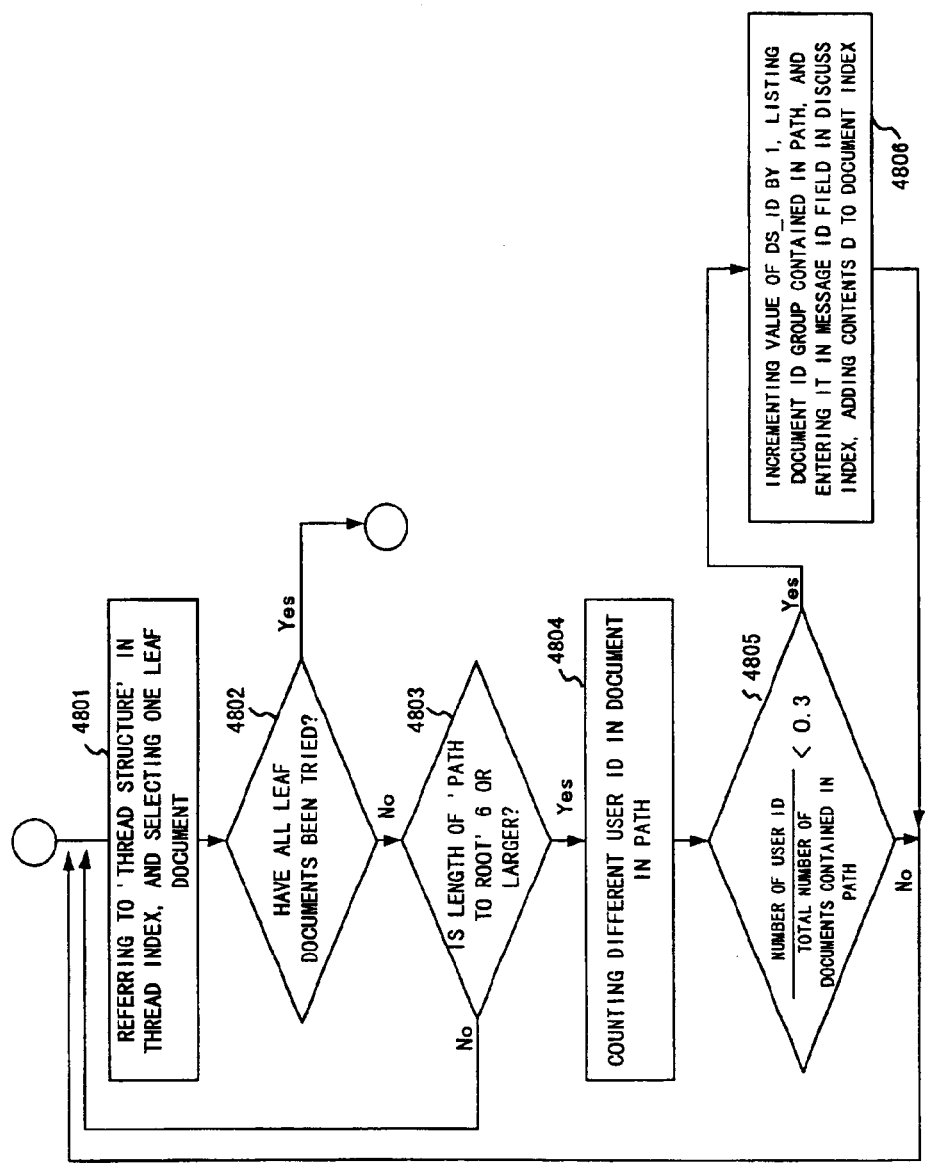
FIG. 48 is a flowchart showing the discussion pattern determining process.

FIG. 48 is a flowchart showing the operations in the Discussion pattern determining process in step 4204 shown in FIG. 42. According to the flowchart, a Discussion pattern can be assumed for each reference path in a thread document group.

First, a document ID corresponding to the leaf document (document at the end of a path) is retrieved by referring to the 'thread tree structure' field of the corresponding entry in the thread index (step 4801).

Then, it is determined whether or not the processes for the document ID corresponding to all leaf documents have been tried (step 4802).

If the processes for the document ID corresponding to all leaf documents have not been tried and the determination in step 4802 is NO, then the 'path to root' field in the entry whose 'document ID' field contains the document ID retrieved in step 4801 is referred to in the document index. Then, it is determined whether or not the length (number of document IDs) from the document ID corresponding to the above described leaf document to the root document is equal to or larger than 6 (step 4803).

If the length is not larger than 6 and the determination in step 4803 is NO, then the topic pattern of the reference path is not assumed as a Discussion pattern. Control is returned to step 4801 to perform a process on the next leaf document.

If the above described length is equal to or larger than 6 and the determination in step 4803 is YES, then the number of different user IDs is counted in a group of documents corresponding to the document ID contained in the 'path to root' field referred to in step 4803 (step 4804).

Then, it is determined whether or not the ratio of the number of the different user IDs to the number of document IDs (total number of documents) contained in the above described 'path to root' field is smaller than 0.3 (step 4805).

If the determination is NO, then it is assumed that there is no discussions among the small specified number of users. Control is returned to step 4801, and the process is performed on the next leaf document.

On the other hand, if the determination in step 4805 is YES, then it is determined that there is a discussion among a small specified number of users. In the DISCUSS index having the data configuration shown in FIG. 40, an entry having the value {maximum value of DS_ID in the index)+1} as a value of the 'DS_ID' field is generated. Then, in the 'message ID' field in the entry, a document ID group in the 'path to root' field referred to in step 4803 are entered as a list. Based on the entered contents, the contents of the 'UID' field and the 'threadID' field are entered. Furthermore, in the document index having the data configuration shown in FIG. 37, the symbol 'D' is entered in the 'message type' field in each entry whose 'document ID' field contains the above described document ID groups (step 4806). Then, control is returned to step 4801 and the process is performed on the next leaf document.

If the processes have been performed on the document IDs corresponding to all leaf documents and the determination in step 4802 is YES, then the Discussion pattern determining process in step 4204 shown in FIG. 42 terminates.

FIG. 49 shows an example of the thread structure extracted in the above described Discussion pattern determining process. In FIG. 49, the initial characters of only a small number of users appear, and it is guessed that a discussion is made in this thread.

Figure 50:
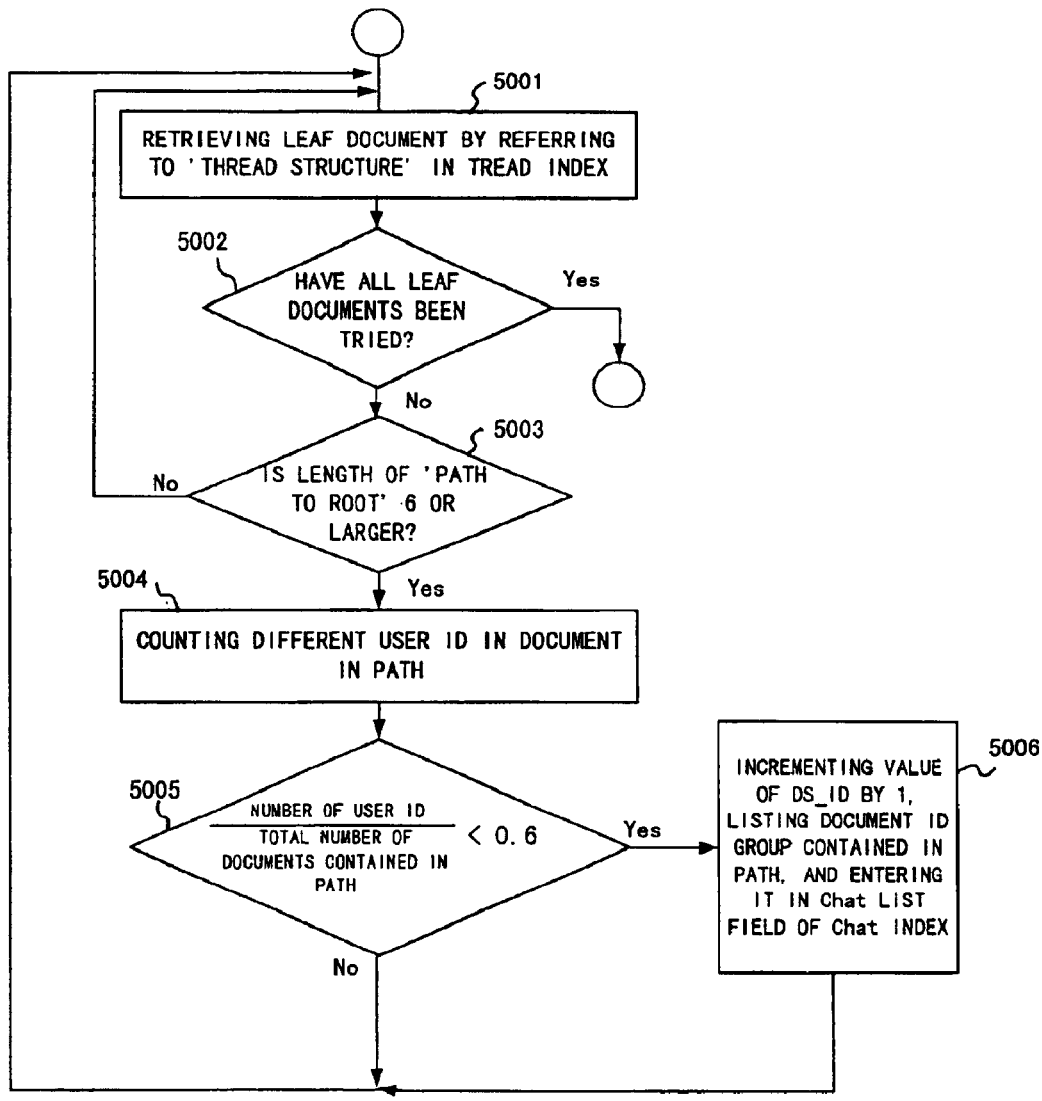
FIG. 50 is a flowchart showing the operations performed by the Chat pattern determining process.

FIG. 50 is a flowchart showing the Chat pattern determining process in step 4205 shown in FIG. 42. According to this flowchart, a Chat pattern is assumed for each reference path in the thread document group.

First, the document ID corresponding to the leaf document (document at the end of a path) can be retrieved by referring to the 'thread tree structure' field of the corresponding entry in the thread index (step 5001).

Next, as a result of the above described retrieval, it is determined whether or not the process on the document ID corresponding to all leaf documents has been tried (step 5002).

If the process on the document ID corresponding to all leaf documents has not been tried and the determination in step 5002 is NO, then the 'path to root' field in the entry having the 'document ID' field containing the document ID retrieved in step 5001 in the document index is referred to. Then, it is determined whether or not the length (number of document IDs) from the document ID corresponding to the above described leaf document to the root document is equal to or larger than 6 (step 5003).

If the length is not equal to or larger than 6 and the determination in step 5003 is NO, then it is assumed that the topic pattern in the reference path is not a Chat pattern. Control is returned to step 5001, and the process is performed on the next leaf document.

If the above described length is equal to or larger than 6, and the determination in step 5003 is YES, then the number of different user IDs is counted in the group of documents corresponding to the group of document IDs contained in the 'path to root' field referred to in step 5003 (step 5004).

Then, it is determined whether or not the ratio of the number of the above described different user IDs to the number of document IDs (total number of documents) contained in the above described 'path to root' field is larger than 0.6 (step 5005).

If the determination is NO, then it is assumed that a chat is made by a number of users. Control is returned to step 5001 and the process is performed on the next leaf document.

On the other hand, if the determination in step 5005 is YES, then it is assumed that a chat is made among a large number of users, and, in the CHAT index having the data configuration shown in FIG. 41, an entry having the value {maximum value of CT_ID in the index)+1} as a value of the 'CT_ID' field is generated. Then, in the 'Chat list' field in the entry, a document ID group in the 'path to root' field referred to in step 5003 are entered as a list. Based on the entered contents, the contents of the 'UID' field and the 'thread ID' field are entered (step 4806). Then, back in step 5001, the process is performed on the next leaf document.

If the process has been tried on the document ID corresponding to all leaf documents, and the determination in step 5002 is YES, then the chat pattern determining process in step 4205 shown in FIG. 42 terminates.

FIG. 51 shows an example of a thread structure extracted in the above described Chat pattern determining process. It is assumed that various initial characters of a large number of users appear, and a chat is being made in this thread.

Principle of the Curtailing Process of a Thread Tree

Described below is the principle of the thread tree curtailing process according to the second embodiment of the present invention.

FIGS. 52 and 53 show examples of displaying a thread structure. FIG. 52 shows an example of a display in a conventional news reader. FIG. 53 shows an example of a display in the above described thread view shown in FIG. 14.

In a thread containing only 17 messages, it is necessary to scroll the screen to see the entire thread because of a large number of lines as shown in FIG. 52, an overflow in the horizontal direction as shown in FIG. 53, etc. Therefore, it is hard to view the entire structure.

FIG. 54 shows an example of a display for n higher order child nodes (n=6 in the example shown in FIG. 54) in the thread. The symbol '+' at the beginning of the line indicates that a child node is omitted, and the number enclosed by parentheses at the end of the line indicates the number of child nodes (number of referenced child in the document index shown in FIG. 37). It is possible to display only a necessary portion by adjusting the value n based on the screen and window size.

FIG. 55 shows an example of a display in which nodes having the same title (excluding the leading 'Re:' ) are omitted in the child nodes. The leading symbol '+' indicates that the child node is omitted. At default, the title of the document in the same thread is the same as the title of the parent node, or the leading 'Re:' indicating the 'following' is added. When an author intentionally changes a title, it explicitly indicates a change of topic at the point. Using this view, a change of topic in the thread can be easily recognized.

FIG. 56 shows an example of displaying a thread of documents generated in the period from 10/1 to 10/5. A node indicates the initial character of the name of an author. In this view, only the transition of a thread with time and the information within a predetermined time can be displayed. Furthermore, document information can be displayed as related to the user's schedule and general news in the world by arranging on the screen the information with the application containing time information such as a scheduler, etc.

Figure 57:
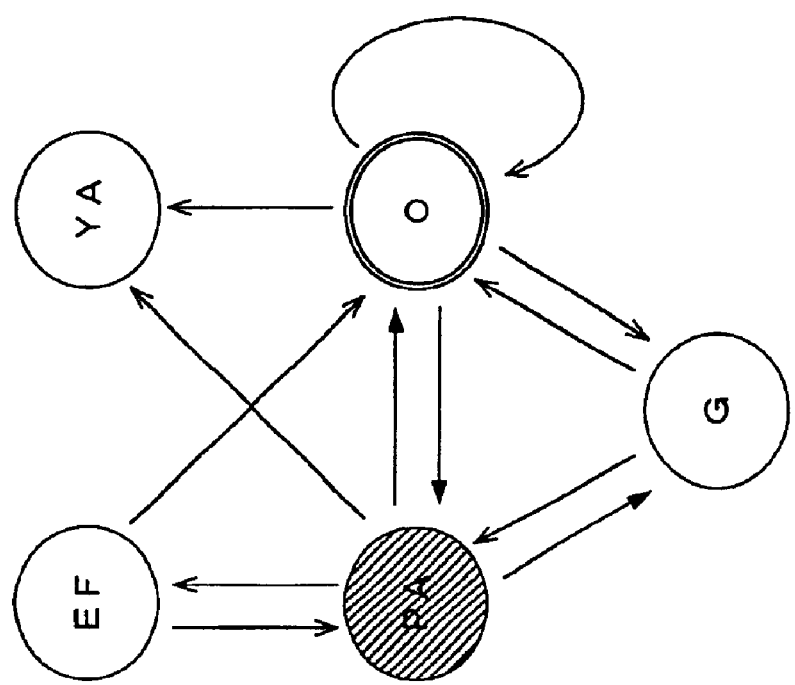
FIG. 57 shows the graph structure containing authors as nodes.
Figure 59:
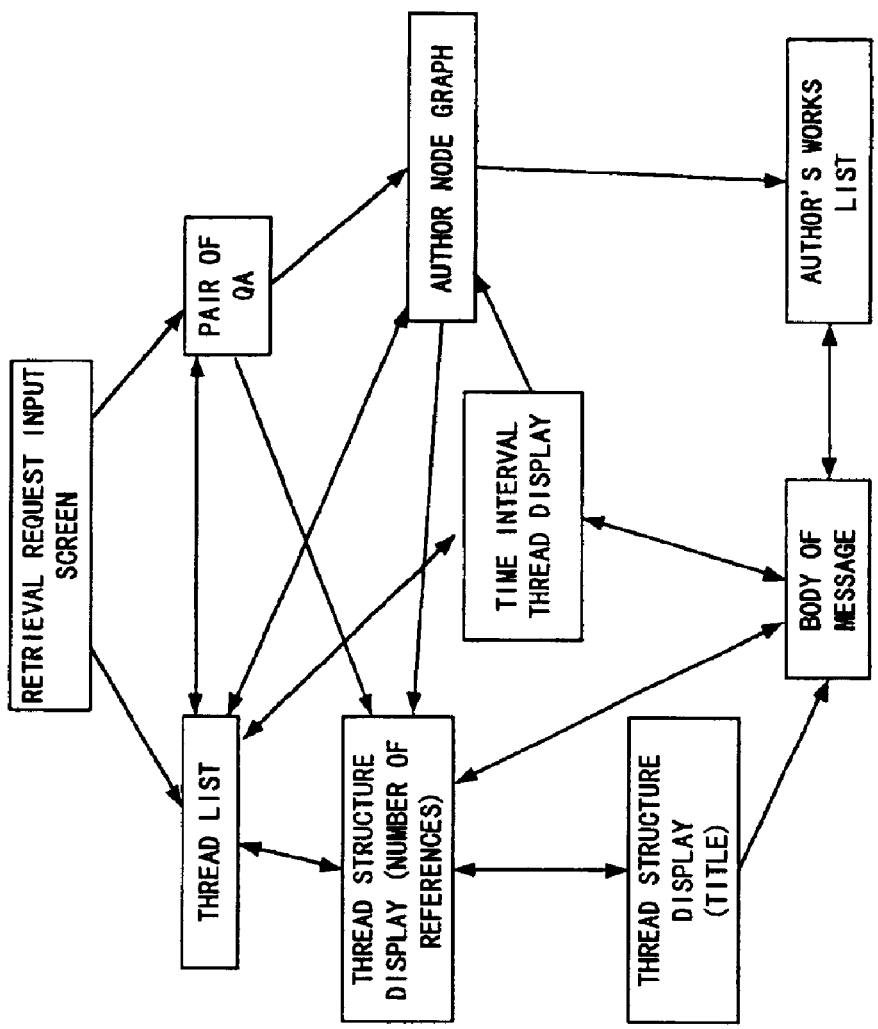
FIG. 59 shows a list of retrieval screens.

FIG. 57 shows the graph structure using an author of a thread as a node. A node indicates an initial character of the name of an author. A node marked with double circles indicates an author of the first message of a thread. The density of a link indicates the number of messages among the authors. Furthermore, the node of a user corresponding to the user ID entered in the ID of a user issuing the largest number of messages in the corresponding entry in the thread index shown in FIG. 38 can be, for example, displayed at a high intensity level. It is easily understood that this thread is occupied by the dialogue between Mr. Ogawa (O) and Partziwal (P).

Retrieval Phase Executing Operation

Described below are the operations of performing the retrieval phase including the above described thread tree curtailing process.

At the retrieval, the user instructs a retrieval request from the input device 3509.

FIG. 58 is a retrieval request input screen. Input items are listed below.

Keyword string (required) contained in a message to be retrieved

Keyword string not to be included in the message to be retrieved

All messages, only the message corresponding to the Q and A pattern as the type of message to be retrieved. All messages at default.

All period, within one month, within on week, etc. as date of message to be retrieved. All period at default.

At the lower portion of the input screen shown in FIG. 58, the latest date containing (as downloaded) the message in the secondary storage device 3503 in the preparation phase prior to retrieval.

Listed below are retrieval results.

List of threads (refer to FIG. 60)

Display of thread structure (including the display with curtailment depending on the number or references, including the display with curtailment based on the same title) (refer to FIG. 61)

Display of time period thread (refer to FIG. 62)

Display of Q and A in combination

Display of author node graph (refer to FIG. 57)

List of opinions input by authors display of messages

These display screens can be switched from and to each other. Listed below are the typical display screens.

Output Result 1: List of Threads

For example, when 'engine' is input as a retrieval keyword, a thread list screen is displayed as shown in FIG. 60. The retrieval results displayed in FIG. 60 are listed below.

Title of the top message of a thread

Name of an author

Date

Size (number of messages of a thread, entire message size)

Contents of a thread (QA: Q and A pattern, DC; Discussion pattern, CT; Chat pattern)

At retrieval, a sorting process is performed based on the size of a thread, and the top ten threads are displayed. When the user clicks the button with the 'next ten threads' pointed to, the next ten threads are displayed.

When there are a number of results to be displayed, a selective retrieval process can be realized by further adding keywords.

A screen can be switched to another by the following methods.

A thread structure is displayed by clicking the button with the title pointed to.

An author node graph is displayed by clicking the button with the name of the author pointed to.

A time period thread is displayed by clicking the button with the date pointed to.

A pair of Q and A are displayed by clicking the button with the Q and A related to the contents of the thread pointed to.

Output Result 2: Display of Thread Structure

FIG. 61 shows an example of displaying a thread structure.

As shown in FIG. 54, a thread structure is displayed as a curtailed tree structure based on the number of reference nodes. Based on the number of lines (length in the vertical direction) in a display area, a node having a smaller number of reference nodes is omitted. Listed below are the contents in displaying nodes. The items to be displayed in each node are appropriately omitted depending on the number of digits (length in the horizontal direction) in the display area.

The symbol '+' at the beginning of a line is added when there is an omitted child node.

A message containing a user-input keyword is displayed at a high intensity level for the title and the name of the author (portion encompassed by a rectangle in FIG. 61).

Title of a message. 'Re:' is added to a following message.

Author of message

Type of message. Q (question), A (answer), or D (discussion) is added depending on the topic pattern assumed by the contents estimation unit 3504 (FIG. 35).

Number of child nodes of the present node. Only added to the node having the symbol '+'.

In a thread, a selective retrieval process can be performed with a further keyword specified.

A screen can be switched to another by the following methods.

The body of a message is displayed by clicking the button with the title pointed to.

An author node graph is displayed by clicking the button with the name of the author pointed to.

A thread structure is displayed as a tree structure curtailed based on the same title by clicking the button with a list of titles pointed to.

Output Result 3; Display of Time Period Thread

FIG. 62A shows an example of displaying a thread in a predetermined time period. A message containing a keyword is displayed with a black circle. Otherwise, a message is displayed with a gray circle. The initial character of the name of an author is added below each node. On this screen, the display period for date, the vertical and horizontal display of date, the window size, the cell width, etc. are variable. Therefore, for example, a scheduler can match another scheduler in size. For example, FIG. 62A shows a scheduler and FIG. 62B shows another, and they match in cell width for time period thread display.

A screen can be switched to another by the following methods.

The body of a message is displayed by clicking the button with the title pointed to.

Output Result 4: QA Combination Display

The QA combination display refers to a combination of a question and an answer which corresponds to the Q and A pattern assumed by the contents estimation unit 3504 (FIG. 35) and is displayed as a table. A line of the table displays the following information.

Title

Questioner

Answerer

A screen can be switched to another by the following methods.

A thread structure is displayed by clicking the button with the title pointed to.

An author node graph is displayed by clicking the button with the name of the author pointed to.

Output Result 5: Author Node Graph

An author node graph refers to a graph relating to the dialogue of authors of each message in the thread. FIG. 57 shows an example of a display.

A screen can be switched to another by the following methods.

A list of an author's input opinions is displayed by clicking the button with the name of an author pointed to.

A thread structure is displayed by clicking the button with the link pointed to.

Output Result 6: List of Opinions of an Author

A list of opinions of an author refers to a screen through which a list of messages input by each author can be displayed. The date, the title, and the type of message (Q, A, D) are displayed in order of date.

A screen can be switched to another by the following methods.

The body of a message is displayed by clicking the button with the title pointed to.

Output Result 7: Body of Message

It refers to the body of message. The link to the name of an author, the title, the date, and the parent message is also displayed.

A screen can be switched to another by the following methods.

A thread structure is displayed by clicking the button with the title pointed to.

A time period thread is displayed by clicking the button with the date pointed to.

An author node graph is displayed by clicking the button with the name of the author pointed to.

Operation of Time Period Thread Display

Figure 63:
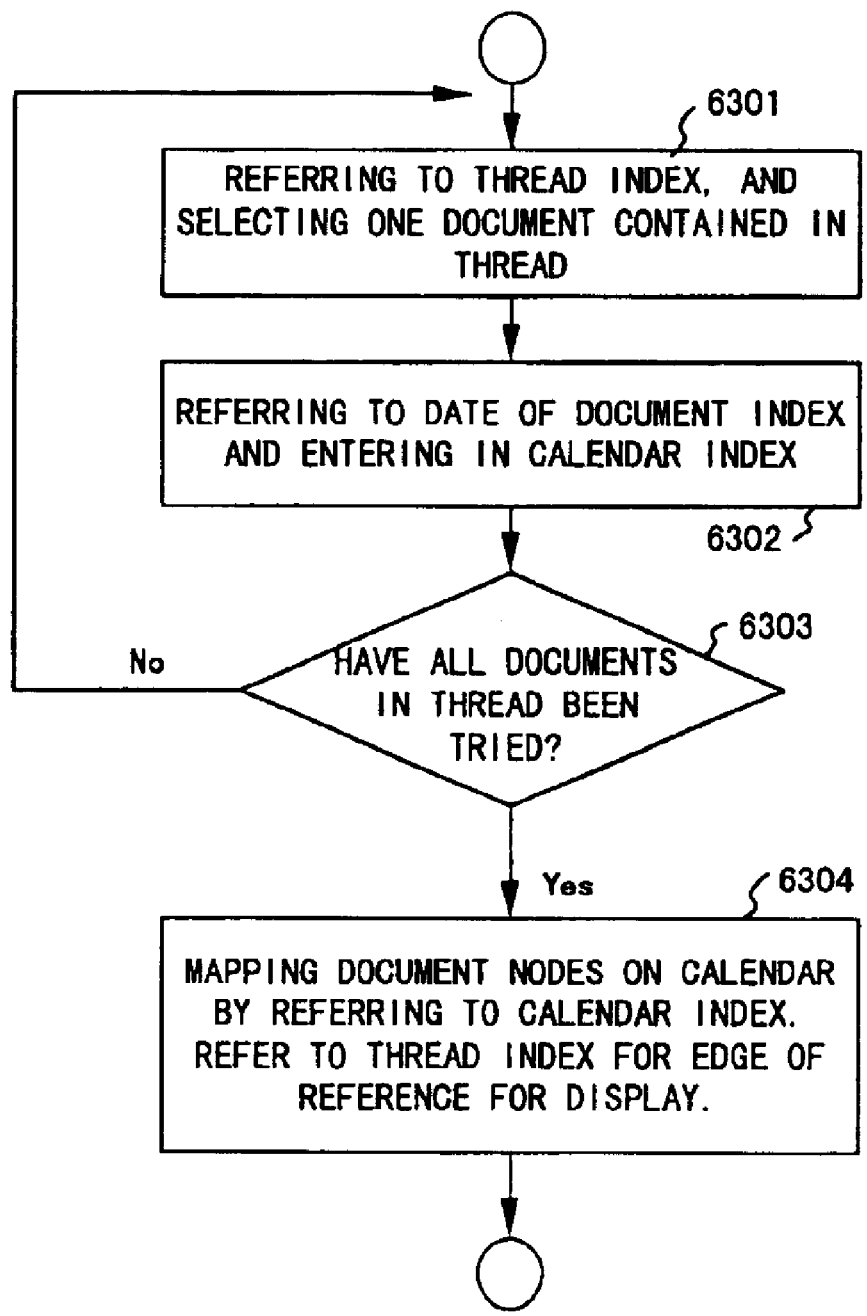
FIG. 63 is a flowchart of generating a display of time period thread.

FIG. 63 is a flowchart showing the operations of the time period thread display performed by the view generation unit 3508.

First, in the thread index having the data configuration shown in FIG. 38, one document ID contained in a thread is selected by referring to the 'thread tree structure' field in the entry corresponding to the thread to be displayed (step 6301).

Next, in the document index having the data configuration shown in FIG. 37, the 'date' field in the entry corresponding to the above described document ID selected is referred to, and the data is entered in the calendar index having the data configuration shown in FIG. 64 (step 6302).

Then, it is determined whether or not the process has been performed on all document IDs in the 'thread tree structure' field in the entry corresponding to the thread to be displayed in the thread index (step 6303).

If the process has not been tried on all document IDs, and the determination in step 6303 is NO, then control is returned to step 6301 and the process on the next document ID is repeatedly performed.

If the process has been tried on all document IDs, and the determination in step 6303 is YES, then document nodes are mapped on the calendar by referring to the calendar index having the data configuration shown in FIG. 64. The edge of reference is displayed by referring to the thread index.

Author Node Graph Display Operations

Figure 65:
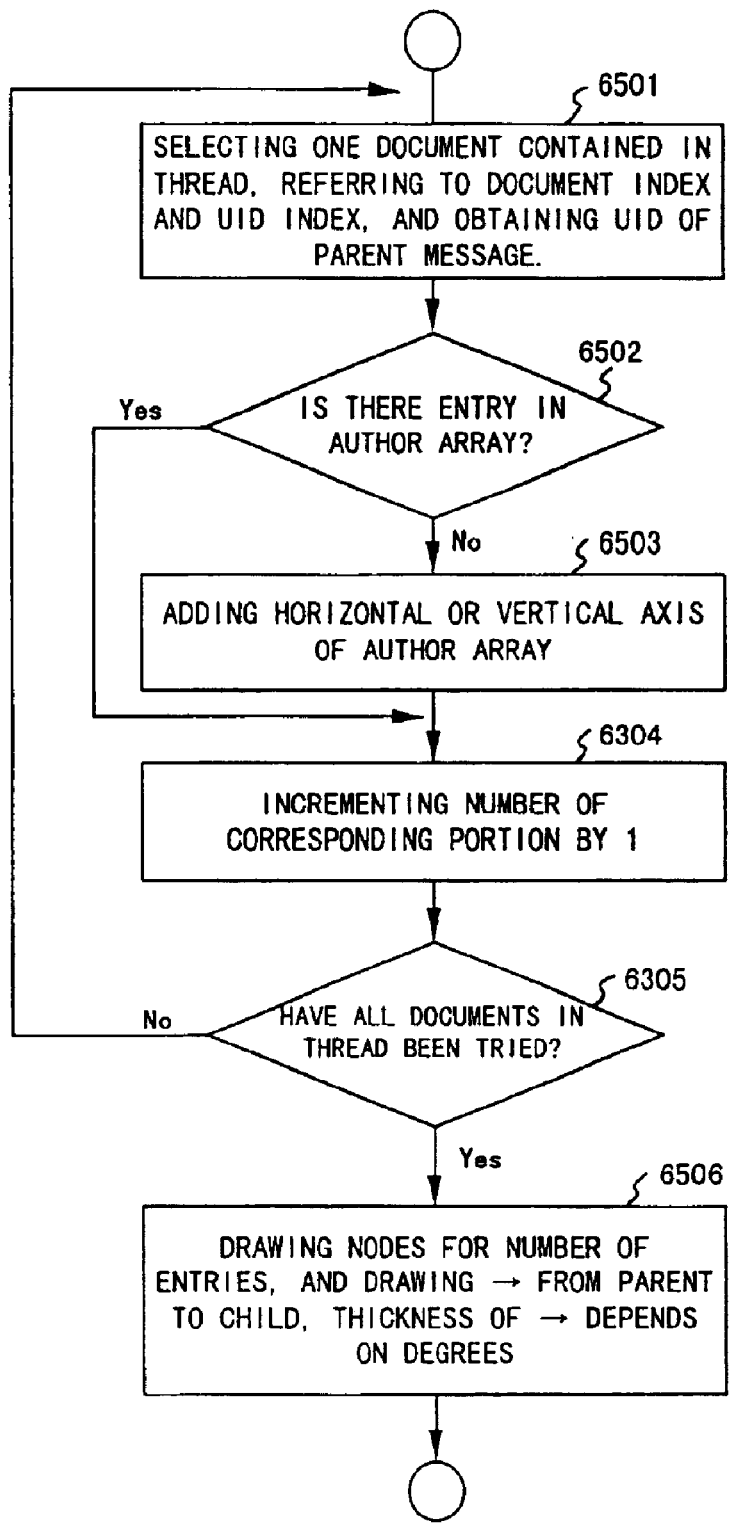
FIG. 65 is a flowchart of generating an author node graph.

FIG. 65 is a flowchart showing the operations of the author node graph display performed by the view generation unit 3508 (FIG. 38).

First, in the thread index having the data configuration shown in FIG. 38, one document ID contained in a thread is selected by referring to the 'thread tree structure' field in the entry corresponding to the thread to be displayed. Next, by referring to the document index having the data configuration shown in FIG. 37 and the user index having the data configuration shown in FIG. 36, a user ID of the parent document (parent message) of the document corresponding to the selected document ID is obtained (step 6501).

Next, it is determined whether or not an entry corresponding to the above described set exists in the author array having the data configuration shown in FIG. 66 (step 6502).

If the entry exists, control is passed to step 6504.

If the entry does not exist, an entry of the horizontal or vertical axis of the author array is added (step 6503).

Then, the number for the above described entry is incremented by 1 (step 6504).

Then, it is determined whether or not the process has been performed on all document IDs in the 'thread tree structure' field in the entry corresponding to the thread to be displayed in the thread index (step 6505).

If the process has not been tried on all document IDs, and the determination in step 6505 is NO, then control is returned to step 6501 and the process on the next document ID is repeatedly performed.

Figure 67:
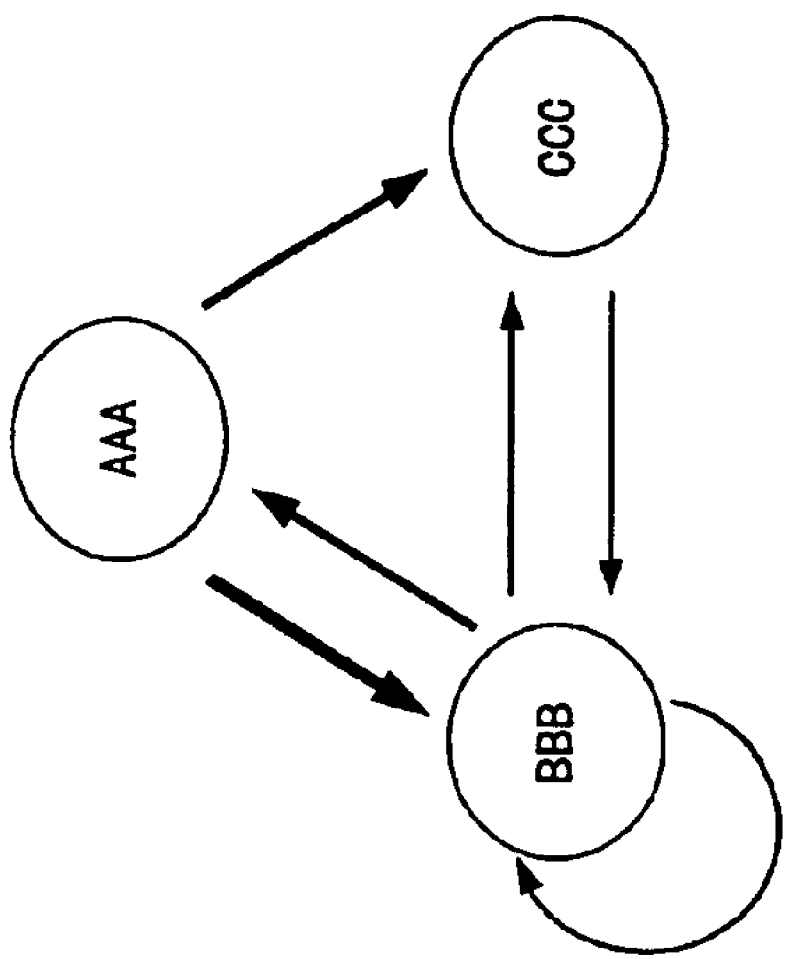
FIG. 67 shows the generation of an author node graph.

If the process has been tried on all document IDs, and the determination in step 6505 is YES, nodes are drawn, as shown in FIG. 67, for the number of entries of the author array having the data configuration shown in FIG. 66, and the symbol '→' is drawn between the parent and the child. The thickness of the line depends on the frequency of the dialogue between the parent and the child (step 6506).

In the above described second embodiment, a thread can be displayed depending on the range of the screen display by curtailing the thread structure curtailment.

Since a retrieval result is automatically displayed with an assumed topic, the user can easily understand the summary of the retrieval result even when there are a large number of threads as a retrieval result.

Furthermore, although there is a large volume of documents in a thread, the same author may have input his or her opinions many times. By providing views based on authors, a key person in the thread can be easily detected and the entire configuration of the thread can be compactly displayed.

Supplement to Storage Medium Storing a Program for Realizing a Preferred Embodiment of the Present Invention The present invention can also be designed as a computer-readable storage medium used to direct a computer to perform the functions realized by each of the configurations according to the preferred embodiments of the present invention.

Figure 68:
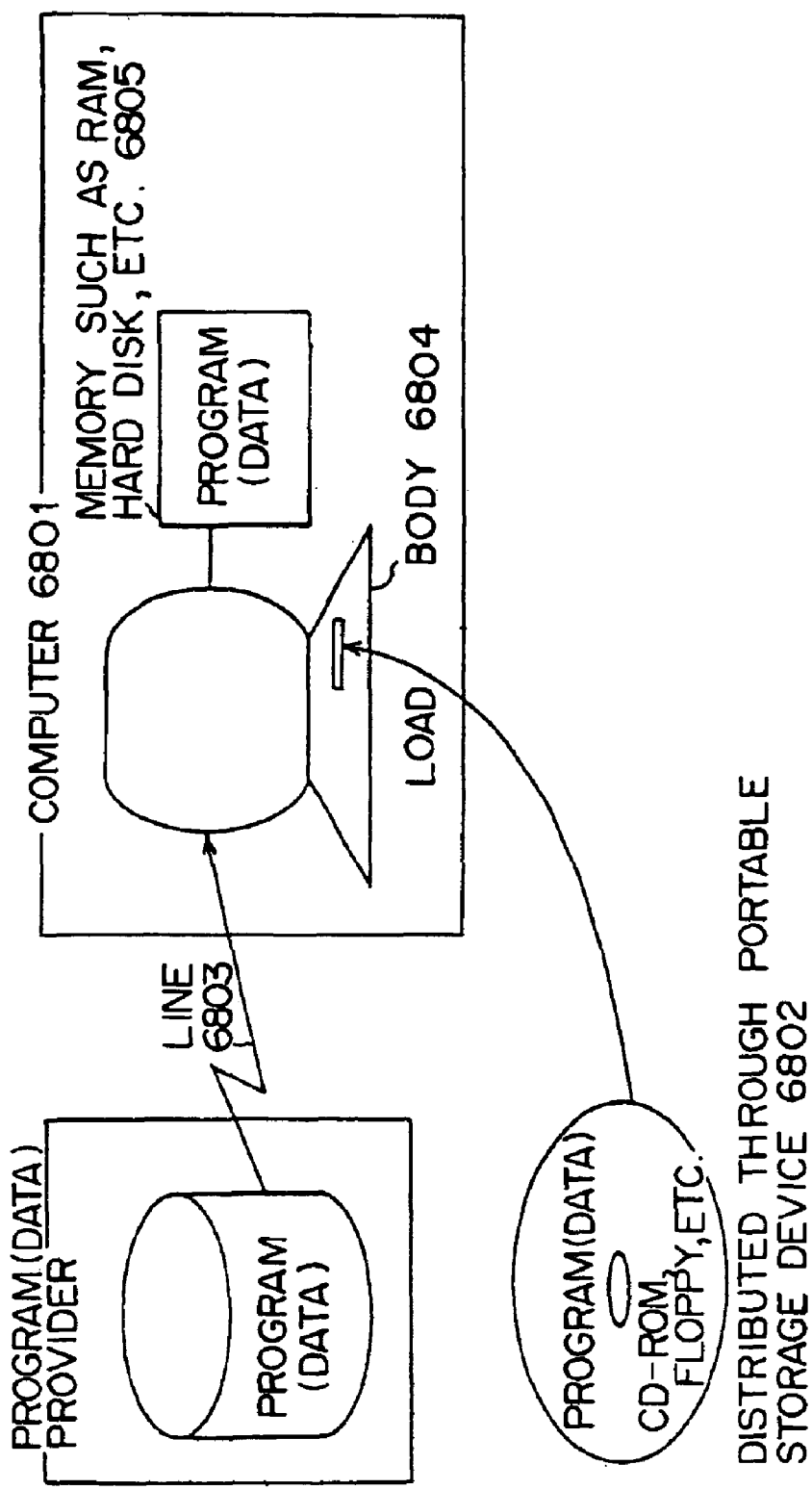
FIG. 68 shows a storage medium storing a program for realizing a preferred embodiment of the present invention.

In this case, for example, a portable storage medium 6802 such as a floppy disk, a CD-ROM disk, an optical disk, a removable hard disk, etc., and a program for realizing each step according to the preferred embodiment of the present invention through a network line 6803 are loaded onto memory (RAM, a hard disk, etc.) 6805 in a body 6804 of a computer 6801 for execution as shown in FIG. 68.

What is claimed is:

1. A relevant document display apparatus for displaying a group of documents containing cross-referenced message documents contributed to at least one of a forum and a message board established through a computer network, the cross-referenced message documents having a cross-referenced relationship in which a document contributed earlier is referenced by documents contributed afterwards, said apparatus comprising:

a document group analysis device to classify a plurality of documents forming a set of documents into at least one group of cross-referenced documents by determining for each document in the set, which of the documents is referenced, and for extracting information about classification as document group information;

a document group keyword extraction device to extract keywords contained in a body of a document forming part of each group of documents based on a statistical analysis by referring to the document group information; and a document group keyword display device to display a title of each document in each group of documents together with the keywords extracted from the body of the document corresponding to the title by said document group keyword extraction device, the title being displayed in a title-displaying field and the keywords being displayed in a keyword-displaying field.

2. The apparatus according to claim 1, wherein said document group keyword display device displays with enhancement a group of documents containing a document specified by a user for retrieval, or a keyword specified for retrieval.

3. A relevant document display apparatus for displaying a group of documents containing cross-referenced message documents contributed to at least one of a forum and a message board established through a computer network, the cross-referenced message documents having a cross-referenced relationship in which a document contributed earlier is referenced by documents contributed afterwards, said apparatus comprising:

a document group analysis device to classify a plurality of documents forming a set of documents into at least one group of cross-referenced documents by determining for each document in the set, which of the documents is referenced, and for extracting information about classification as document group information;

a topic analysis device to further classify each group of cross-referenced documents based on topics extracted from each document forming part of each group of cross-referenced documents, and to extract information about further classification as topic classification information;

a topic keyword extraction device to extract keywords contained in a body of each document relevant to each topic obtained by the further classification of each of the groups of documents based on a statistical analysis by referring to the document group information and the topic classification information; and a topic keyword display device to display a title of each document relevant to each topic obtained by the further classification together with the keywords extracted from the body of each document corresponding to each title by said topic keyword extraction device, the title being displayed in a title-displaying field and the keywords being displayed in a keyword-displaying field.

4. A relevant document display method for displaying a group of documents containing cross-referenced message documents contributed to at least one of a forum and a message board established through a computer network and having a cross-referenced relationship in which a document contributed earlier is referenced by documents contributed afterwards, said method comprising:

classifying a plurality of documents forming a set of documents into at least one group of cross-referenced documents by determining for each document in the set, which of the documents is referenced;

extracting information about classification as document group information;

extracting keywords contained in a body of a document forming part of each group of documents based on a statistical analysis by referring to the document group information; and displaying a title of each document in each group of documents together with the keywords extracted from the body of the document corresponding to the title, the title being displayed in a title-displaying field and the keywords being displayed in a keyword-displaying field.

5. The method according to claim 4, further comprising displaying with enhancement a group of documents containing a document specified by a user for retrieval, or a keyword specified for retrieval.

6. A relevant document display method for displaying a group of documents containing cross-referenced message documents contributed to at least one of a forum and a message board established through a computer network and having a cross-referenced relationship in which a document contributed earlier is referenced by documents contributed afterwards, said method comprising:

classifying a plurality of documents forming a set of documents into at least one group of cross-referenced documents by determining for each document in the set, which of the documents is referenced;

extracting information about classification as document group information;

further classifying each of the classified group of documents based on topics extracted from each document forming part of each group of documents, and extracting information about further classification as topic classification information;

extracting keywords contained in a body of each document relevant to each topic obtained by the further classification of each group of cross-referenced documents based on a statistical analysis by referring to the document group information and the topic classification information; and displaying a title of each document relevant to each topic obtained by the further classification together with the keywords extracted from the body of each document corresponding to each title, the title being displayed in a title-displaying field and the keywords being displayed in a keyword-displaying field.

7. A computer-readable storage medium storing instructions to direct a computer to perform a method for displaying a group of documents containing cross-referenced message documents contributed to at least one of a forum and a message board established through a computer network and having a cross-referenced relationship in which a document contributed earlier is referenced by documents contributed afterwards, said method comprising:

classifying a plurality of documents forming a set of documents into at least one group of cross-referenced documents by determining for each document in the set, which of the documents is referenced;

extracting information about classification as document group information;

extracting keywords contained in a body of a document forming part of each group of documents based on a statistical analysis by referring to the document group information; and displaying a title relevant to each group of documents together with the corresponding keywords extracted from the bodies of the group of documents, the title being displayed in a title-displaying field and the keywords being displayed in a keyword-displaying field.

8. A relevant document display method for displaying a group of documents containing cross-referenced message documents contributed to at least one of a forum and a message board established through a computer network and having a cross-referenced relationship in which a document contributed earlier is referenced by documents contributed afterwards, said method comprising:

classifying a plurality of documents forming a set of documents into at least one group of cross-referenced documents by determining for each document in the set, which of the documents is referenced;

extracting information about classification as document group information;

automatically extracting keywords contained in a body of a document forming part of each group of documents based on a statistical analysis by referring to the document group information and without requiring user input; and displaying a title of each document in each group of documents together with the keywords extracted from the body of the document corresponding to the title, the title being displayed in a title-displaying field and the keywords being displayed in a keyword-displaying field.

* * * * *